US008619205B2

(12) United States Patent
Sakai et al.

(10) Patent No.: US 8,619,205 B2
(45) Date of Patent: Dec. 31, 2013

(54) THREE-DIMENSIONAL VIDEO RECOGNITION SYSTEM, VIDEO DISPLAY DEVICE AND ACTIVE SHUTTER GLASSES

(75) Inventors: Akira Sakai, Osaka (JP); Kazuyoshi Sakuragi, Osaka (JP); Masahiro Hasegawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 85 days.

(21) Appl. No.: 13/503,493

(22) PCT Filed: Jul. 6, 2010

(86) PCT No.: PCT/JP2010/061455
§ 371 (c)(1),
(2), (4) Date: Apr. 23, 2012

(87) PCT Pub. No.: WO2011/058784
PCT Pub. Date: May 19, 2011

(65) Prior Publication Data
US 2012/0206665 A1    Aug. 16, 2012

(30) Foreign Application Priority Data

Nov. 13, 2009  (JP) ................................. 2009-260284
May 18, 2010  (JP) ................................. 2010-114599

(51) Int. Cl.
*G02F 1/1335*      (2006.01)
(52) U.S. Cl.
USPC .......................................................... 349/15

(58) Field of Classification Search
USPC ............................................................ 349/15
See application file for complete search history.

(56) References Cited

U.S. PATENT DOCUMENTS

| 6,222,672 | B1 | 4/2001 | Towler et al. |
| 2002/0044350 | A1 | 4/2002 | Sato et al. |
| 2008/0062259 | A1 | 3/2008 | Lipton et al. |

FOREIGN PATENT DOCUMENTS

| JP | 61-227498 | 10/1986 |
| JP | 2001-154640 | 6/2001 |
| JP | 2002-082307 | 3/2002 |
| WO | WO 2007/043153 | 4/2007 |

OTHER PUBLICATIONS

International Search Report for PCT/JP2010/061455, mailed Aug. 31, 2010.
Written Opinion of the International Searching Authority for PCT/JP2010/061455, mailed Aug. 31, 2010.

*Primary Examiner* — Phu Vu
(74) *Attorney, Agent, or Firm* — Nixon & Vanderhye, P.C.

(57) ABSTRACT

A three-dimensional video recognition system comprises a display device, a front plate, and AS glasses. Each of the AS glasses includes a first λ/4 plate, a first linear polarizing element, a liquid crystal cell, and a second linear polarizing element in this order from the outer surface side. The display device includes a third linear polarizing element on an observation surface side of the display device. The front plate has a second λ/4 plate. Specific angles formed between a transmission axis of polarizing elements and λ/4 plates are provided.

11 Claims, 10 Drawing Sheets

THREE-DIMENSIONAL VIDEO RECOGNITION SYSTEM, VIDEO DISPLAY DEVICE AND ACTIVE SHUTTER GLASSES

This application is the U.S. national phase of International Application No. PCT/JP2010/061455, filed 6 Jul. 2010, which designated the U.S. and claims priority to Japan Application No. 2009-260284, filed 13 Nov. 2009; and Japan Application No. 2010-114599, filed 18 May 2010, the entire contents of each of which are hereby incorporated by reference.

TECHNICAL FIELD

The present invention relates to a three-dimensional video recognition system, a video display device, and active shutter glasses. More particularly, the present invention relates to a three-dimensional video recognition system, a video display device, and active shutter glasses which are suitable for a three-dimensional video recognition system based on an active shutter system.

BACKGROUND ART

As three-dimensional video recognition system using glasses, there are known an anaglyph system, a passive glass system (hereinafter may be referred to simply as passive system), an active shutter glass system (hereinafter may be referred to simply as active system), and the like. In the anaglyph system, the display quality is extremely low, and so-called cross talk is caused. In each of the passive system and the active system, polarizing glasses are used. Hereinafter, the polarizing glasses used in the active system are also referred to as active shutter glasses.

In the passive system, the polarizing glasses themselves can be manufactured to be lightweight and inexpensive, but in order to generate the left-eye and right-eye images, it is necessary to use pixels separately for each of the left-eye and right-eye images. For this reason, at the time of three-dimensional video display, the spatial resolution, which is two times the resolution in the case of usual two-dimensional video display, is required, and hence the resolution of three-dimensional video is generally low. Also, the display quality is also low as compared with the active system. Further, birefringent layers, such as a λ/2 plate and a λ/4 plate, need to be patterned and formed in each of the pixels, which results in an increase in the cost of the video display device.

On the other hand, the active system is excellent in display performance. For example, in the case where a video display device has a resolution of full high-vision (1920×1080), three-dimensional display can be performed with the resolution of full high-vision as it is. Further, as the performance required for the video display device of the active system, a high frame rate and high-performance image processing are required, and these requirements can be satisfied even by an existing high-end video display device. That is, even in the stage before the spread of 3D contents, the existing high-end video display device can be used as a video display device capable of 3D display without incorporation of a special member into the video display device itself.

Specifically, for example, as described in Patent Document 1, a technique is disclosed which uses active shutter glasses, each having a pair of polarizers and a liquid crystal provided between the pair of polarizers. Further, a technique is disclosed which utilizes a first polarizing filter arranged on the display surface, a second polarizing filter arranged in front of each eye of the observer, and a liquid crystal inclusion body provided between the both polarizing filters (see, for example, Patent Document 2).

Further, from the viewpoint of design improvement, a protective plate is often arranged in front of the screen of not only the video display device for three-dimensional video recognition system but also a recent TV display screen.

Further, in recent years, a touch panel is often arranged as input means in front of the screen of various electronic devices, such as portable terminals, such as a portable telephone and a PDA (Personal Digital Assistants), an electronic notebook, a personal computer, a copying machine, and a terminal device for game.

CITATION LIST

Patent Document

[Patent Document 1] JP 61-227498A
[Patent Document 2] JP 2002-82307A

SUMMARY OF THE INVENTION

However, there have been the following problems in the three-dimensional video recognition system in which a liquid crystal display device is used as the video display device for the three-dimensional video recognition system, and in which active shutter glasses are used as the polarizing glasses.

For example, as shown in FIG. 16, when a transmission axis 1121t of a polarizer 1121 provided on the outer surface side of an active shutter glass 1120 is not in parallel with a transmission axis 1111t of a polarizer 1111 provided on the front surface side of a liquid crystal display device 1110, the brightness of the 3-dimensional image observed through the glasses 1120 is reduced. In order to compensate the reduced brightness, it is necessary to increase the brightness of the screen of the display device 1110. However, this method causes an increase in power consumption and hence is not desirable from the viewpoints of ecology and of protection of global environment. In order to avoid this problem, it is necessary to reduce the design flexibility and choices of both the glasses 1120 and the liquid crystal display device 1110.

Further, as shown in FIG. 17, also in the case where the transmission axis 1121t of the polarizer 1121 provided on the outer surface side of the active shutter glass 1120 is designed beforehand to be in parallel with the transmission axis 1111t of the polarizer 1111 provided on the front surface side of the liquid crystal display device 1110, when the observer rotates his/her face (glasses 1120), the brightness of the screen is reduced. For example, when a scene, in which the observer views the screen while lying down on the floor, is assumed, such system cannot be practically used.

The cause of these problems is that a linear polarizing element is used for light modulation in both the active shutter glasses and the liquid crystal display device, and that the transmissivity of the two linear polarizing elements superimposed at a relative angle θ is proportional to the square of cos θ.

On the other hand, in Patent Document 2, a system is described in which the reduction of shutter function due to the rotation of the glasses is suppressed by using two λ/4 plates. FIG. 18 shows a configuration of a three-dimensional video recognition system described in Patent Document 2.

This system is configured by including a video display device 1210 and glasses 1220. The display device 1210 includes a CRT 1211, a linear polarizing element 1212, and a λ/4 plate 1213 in this order from a back surface side. Each of the glasses 1220 includes a λ/4 plate 1221, a liquid crystal cell 1222, and a linear polarizing element 1223 in this order from the outer surface side.

Thereby, it is possible to suppress the reduction in the brightness of the screen at the time when the observer rotates his/her face. However, this system is configured such that the shutter function is obtained by the linear polarizing element 1212 and the λ/4 plate 1213 which are provided on the most front surface of the display device 1210, and by the λ/4 plate 1221, the liquid crystal cell 1222 and the linear polarizing element 1223 which are provided on the side of each of the glasses 1220. In this system, there is a case where a sufficient shutter effect cannot be obtained because of the following reasons (A) to (C).

(A) In the case where the relative relationship between the display device 1210 and the glasses 1220 are changed so that the in-plane slow axis 1213s of the λ/4 plate 1213 and the in-plane slow axis 1221s of the λ/4 plate 1221 are arranged in non-parallel relationship to each other, circularly polarized light emitted from the display device 1210 enters into the glasses 1220 from an oblique direction different from the normal direction of the λ/4 plate 1221 (the liquid crystal cell 1222 and the linear polarizing element 1223), and passes through the glasses 1220. For this reason, the relative relationship between the in-plane slow axis 1213s of the λ/4 plate 1213 (and/or the transmission axis 1212t of the linear polarizing element 1212) and the in-plane slow axis 1221s of the λ/4 plate 1221 (and/or the transmission axis 1223t of the linear polarizing element 1223) becomes different from the design value, so that the polarization conversion as designed does not occur as a whole.

(B) The polarization conversion as designed does not occur in wavelengths other than the designed center wavelength due to the influence of the wavelength dispersion characteristics of the phase difference between the λ/4 plate 1213 and the λ/4 plate 1221. This can be easily understood by considering, for example, the case where the glasses 1220 are rotated so that the in-plane slow axis 1213s and the in-plane slow axis 1221s become in parallel with each other. When it is assumed that the liquid crystal cell 1222 is in a vertical alignment mode, the shutter effect in this case is eventually realized by the λ/2 plate (=the λ/4 plate 1213+the λ/4 plate 1221) sandwiched between the two linear polarizing elements arranged in parallel Nicol. In such a case, as is well known, the sufficient dark display is not performed unless the λ/2 plate is wide-banded. That is, the reduction in the shutter effect accompanied by coloring is observed.

(C) A reduction in the degree of polarization is caused in the process in which circularly polarized light emitted from the λ/4 plate 1213 enters into the λ/4 plate 1221 via an air layer. This is caused by the reflection at the boundary surface between the λ/4 plate 1213 and the air layer, the reflection at the boundary surface between the air layer and the λ/4 plate 1221, the influence of the scattering due to the dust and dirt in the air layer, and the like.

The present invention has been made in view of the above described circumstances. An object of the present invention is to provide a three-dimensional video recognition system, a video display device, and active shutter glasses, in which, even when the observer's visual point and the inclination of the observer's face are changed, the reduction in the brightness of the screen can be suppressed, and in which a sufficient shutter effect can be obtained, and further a bright three-dimensional video display can be obtained without increase in power consumption.

DISCLOSURE OF THE INVENTION

The present inventors made various investigations about a three-dimensional video recognition system in which, even when the observer's visual point and the inclination of the observer's face are changed, the reduction in the brightness of the screen can be suppressed, and in which a sufficient shutter effect can be obtained and further a bright three-dimensional video display can be obtained without increase in power consumption, and focused on a technique using circularly polarized light. Then, the present inventors found out that image light emitted from a video display device can be converted into circularly polarized light in the path from the video display device to active shutter glasses in such a manner that a first a λ/4 plate, a first linear polarizing element, a liquid crystal cell, and a second linear polarizing element are provided on each of active shutter glasses in this order from an outer surface side of each of the active shutter glasses, that a third linear polarizing element is provided on an observation surface side of the video display device, that a second λ/4 plate is arranged between the third linear polarizing element and the first λ/4 plate, and that the angle between the transmission axis of the first linear polarizing element and the in-plane slow axis of the first λ/4 plate, and the angle between the transmission axis of the third linear polarizing element and the in-plane slow axis of the second λ/4 plate are optimized. Also, the present inventors found out that, with this system, the shutter function can be given to the active shutter glasses themselves. As a result, the present inventors came up with an idea that, with this system, the above described problems can be effectively solved without increase in the brightness of the screen of the display device, that is, without increase in power consumption, and reached the present invention.

That is, the present invention is to provide a three-dimensional video recognition system (hereinafter may be referred to as "first three-dimensional video recognition system of the present invention") configured by including a video display device which can display a right-eye image and a left-eye image alternately in a time division manner on a screen of the video display device, and active shutter glasses which can alternately switch between a light transmitting state and a light shielding state of right and left lens sections in synchronization with the right-eye image and the left-eye image, the three-dimensional video recognition system being featured in that each of the active shutter glasses includes a first λ/4 plate, a first linear polarizing element, a liquid crystal cell, and a second linear polarizing element in this order from an outer surface side of each of the active shutter glasses, in that the video display device includes a third linear polarizing element provided on an observation surface side of the video display device, the three-dimensional video recognition system being featured by further including a second λ/4 plate, and being featured in that the second λ/4 plate is arranged between the third linear polarizing element and the first λ/4 plate, and in that, when an angle formed between a transmission axis of the first linear polarizing element and an in-plane slow axis of the first λ/4 plate is defined as φ1, and when an angle formed between a transmission axis of the third linear polarizing element and an in-plane slow axis of the second λ/4 plate is defined as φ2, the following expressions (1) and (2) or the following expressions (3) and (4) are satisfied.

$$40° \leq \phi1 \leq 50° \tag{1}$$

$$40° \leq \phi2 \leq 50° \tag{2}$$

$$130° \leq \phi1 \leq 140° \tag{3}$$

$$130° \leq \phi2 \leq 140° \tag{4}$$

However, in the first three-dimensional video recognition system of the present invention, $\phi 1$ is measured as viewed from the side of the first $\lambda/4$ plate, and is measured in a counterclockwise direction taken as a positive direction with reference to a direction of the transmission axis of the first linear polarizing element. Similarly, $\phi 2$ is measured as viewed from the side of the second $\lambda/4$ plate, and is measured in a counterclockwise direction taken as a positive direction with reference to a direction of the transmission axis of the third linear polarizing element.

The configuration of the first three-dimensional video recognition system of the present invention is not especially limited by other components as long as it essentially includes such components. For example, the first three-dimensional video recognition system of the present invention may further include a front plate arranged on a front surface side of the video display device, and the second $\lambda/4$ plate may be provided on the front plate.

In this way, the present invention is also to provide a three-dimensional video recognition system (hereinafter may be referred to as "second three-dimensional video recognition system of the present invention") configured by including a video display device which can display a right-eye image and a left-eye image alternately in a time division manner on a screen of the video display device, and active shutter glasses which can alternately switch between a light transmitting state and a light shielding state of right and left lens sections in synchronization with the right-eye image and the left-eye image, and a front plate arranged on a front surface side of the video display device, the three-dimensional video recognition system being featured in that each of the active shutter glasses includes a first $\lambda/4$ plate, a first linear polarizing element, a liquid crystal cell, and a second linear polarizing element in this order from an outer surface side of each of the active shutter glass, in that the video display device includes a third linear polarizing element provided on an observation surface side of the video display device, in that the front plate includes a second $\lambda/4$ plate, and in that, when an angle formed between a transmission axis of the first linear polarizing element and an in-plane slow axis of the first $\lambda/4$ plate is defined as $\phi 1$, and when an angle formed between a transmission axis of the third linear polarizing element and an in-plane slow axis of the second $\lambda/4$ plate is defined as $\phi 2$, the above-described expressions (1) and (2) or the above-described expressions (3) and (4) are satisfied.

However, in the second three-dimensional video recognition system of the present invention, $\phi 1$ is measured as viewed from the side of the first $\lambda/4$ plate, and is measured in a counterclockwise direction taken as a positive direction with reference to a direction of the transmission axis of the first linear polarizing element. Similarly, $\phi 2$ is measured as viewed from the side of the second $\lambda/4$ plate, and is measured in a counterclockwise direction taken as a positive direction with reference to a direction of the transmission axis of the third linear polarizing element.

The configuration of the second three-dimensional video recognition system of the present invention is not especially limited by other components as long as it essentially includes such components.

For example, in the first three-dimensional video recognition system of the present invention, the second $\lambda/4$ plate may be provided at the video display device.

In this way, the present invention is to also provide a three-dimensional video recognition system (hereinafter may be referred to as "third three-dimensional video recognition system of the present invention") configured by including a video display device which can display a right-eye image and a left-eye image alternately in a time division manner on a screen of the video display device, and active shutter glasses which can alternately switch between a light transmitting state and a light shielding state of right and left lens sections in synchronization with the right-eye image and the left-eye image, the three-dimensional video recognition system being featured in that each of the active shutter glasses includes a first $\lambda/4$ plate, a first linear polarizing element, a liquid crystal cell, and a second linear polarizing element in this order from an outer surface side of each of the active shutter glasses, in that the video display device includes a third linear polarizing element provided on an observation surface side of the video display device, and a second $\lambda/4$ plate provided on the observation surface side of the third linear polarizing element, and in that, when an angle formed between a transmission axis of the first linear polarizing element and an in-plane slow axis of the first $\lambda/4$ plate is defined as $\phi 1$, and when an angle formed between a transmission axis of the third linear polarizing element and an in-plane slow axis of the second $\lambda/4$ plate is defined as $\phi 2$, the above-described expressions (1) and (2) or the above-described expressions (3) and (4) are satisfied.

However, in the third three-dimensional video recognition system of the present invention, $\phi 1$ is measured as viewed from the side of the first $\lambda/4$ plate, and is measured in a counterclockwise direction taken as a positive direction with reference to a direction of the transmission axis of the first linear polarizing element. Similarly, $\phi 2$ is measured as viewed from the side of the second $\lambda/4$ plate, and is measured in a counterclockwise direction taken as a positive direction with reference to a direction of the transmission axis of the third linear polarizing element.

Note that, in the first, second, and third three-dimensional video recognition systems of the present invention, when $\phi 1$ and $\phi 2$ are deviated from the above-described ranges, there is a case where the effect of the present invention cannot be sufficiently obtained.

In the following, preferred forms of the first, second and third three-dimensional video recognition systems according to the present invention are described in detail.

In the first, second and third three-dimensional video recognition systems of the present invention, it is preferred that the liquid crystal cell is a first liquid crystal cell, that the video display device is a liquid crystal display device, and that a fourth linear polarizing element, a second liquid crystal cell, and the third linear polarizing element are provided in this order from a back surface side. A conventional liquid crystal display device is generally provided with a front side polarizing element. Therefore, according to the above-described form, the conventional front side polarizing element can be used as the third linear polarizing element, and hence it is not necessary to newly provide the third linear polarizing element. Thereby, the cost can be reduced.

In the second three-dimensional video recognition system of the present invention, it is preferred that the front plate is arranged to cover the screen (display area) of the video display device, and is further provided with a protective plate or a touch panel.

On the other hand, the front plate may be a member which can be installed arbitrarily by the observer. Thereby, when a two-dimensional video is displayed, the front plate is removed, and the two-dimensional video can be viewed without through the front plate. Therefore, it is possible to improve the brightness of the screen at the time when a two-dimensional video is displayed.

In the second three-dimensional video recognition system of the present invention, it is preferred that the front plate further includes a surface treatment film, and that the second λ/4 plate and the surface treatment film are provided on the front surface side of the protective plate or the touch panel. Thereby, the manufacturing process can be simplified, and the cost can be reduced.

Further, the present invention is also to provide a video display device which can be used together with active shutter glasses, each including a first λ/4 plate, a first linear polarizing element, a liquid crystal cell, and a second linear polarizing element in this order from an outer surface side of each of the active shutter glass, and which can display a right-eye image and a left-eye image alternately in a time division manner on a screen of the display device, the video display device being featured by including a third linear polarizing element provided on an observation surface side of the video display device, and a second λ/4 plate provided on the observation surface side of the third linear polarizing element, and being featured in that, when an angle formed between a transmission axis of the third linear polarizing element and an in-plane slow axis of the second λ/4 plate is defined as φ2, the above-described expressions (2) or (4) is satisfied.

However, in the video display device of the present invention, φ2 is measured as viewed from the side of the second λ/4 plate, and is measured in a counterclockwise direction taken as a positive direction with reference to a direction of the transmission axis of the third linear polarizing element.

Note that, when φ2 is deviated from the above-described range, there is a case where the effect of the present invention cannot be sufficiently obtained.

The configuration of the video display device of the present invention is not especially limited by other components as long as it essentially includes such components.

In the video display device of the present invention, it is preferred that the liquid crystal cell is a first liquid crystal cell, that the video display device is a liquid crystal display device, and that a fourth linear polarizing element, a second liquid crystal cell, and the third linear polarizing element are provided in this order from a back surface side. A conventional liquid crystal display device is generally provided with a front side polarizing element. Therefore, according to the above-described form, the conventional front side polarizing element can be used as the third linear polarizing element, and hence it is not necessary to newly provide the third linear polarizing element. Thereby, the cost can be reduced.

Further, the present invention is also to provide active shutter glasses which can alternately switch between a light transmitting state and a light shielding state of right and left lens sections in synchronization with a right-eye image and a left-eye image that are displayed alternately in a time division manner, each of the active shutter glasses being featured by including a λ/4 plate, a first linear polarizing element, a liquid crystal cell, and a second linear polarizing element in this order from the outer surface side, and being featured in that, when an angle formed between a transmission axis of the first linear polarizing element and an in-plane slow axis of the λ/4 plate is defined as φ1, the above-described expression (1) or (3) is satisfied.

However, in the active shutter glasses of the present invention, φ1 is measured as viewed from the side of the first λ/4 plate, and is measured in a counterclockwise direction taken as a positive direction with reference to a direction of the transmission axis of the first linear polarizing element.

Note that, when φ1 is deviated from the above-described range, there is a case where the effect of the active shutter glasses of the present invention cannot be sufficiently obtained.

The configuration of the active shutter glasses of the present invention is not especially limited by other components as long as it essentially includes such components.

ADVANTAGEOUS EFFECTS OF THE INVENTION

According to the first, second and third three-dimensional video recognition systems of the present invention, even when the observer's visual point and the inclination of the observer's face are changed, the reduction in the brightness of the screen can be suppressed, and also a sufficient shutter effect can be obtained, and further a bright three-dimensional video display can be obtained without increase in power consumption.

The video display device of the present invention can be suitably used as a display device for a three-dimensional video recognition system in which, even when the observer's visual point and the inclination of the observer's face are changed, the reduction in the brightness of the screen can be suppressed, and also a sufficient shutter effect can be obtained, and further a bright three-dimensional video display can be obtained without increase in power consumption.

The active shutter glasses of the present invention can be suitably used as active shutter glasses for a three-dimensional video recognition system in which, even when the observer's visual point and the inclination of the observer's face are changed, the reduction in the brightness of the screen can be suppressed, and also a sufficient shutter effect can be obtained, and further a bright three-dimensional video display can be obtained without increase in power consumption.

MODES FOR CARRYING OUT THE INVENTION

Figure 1:
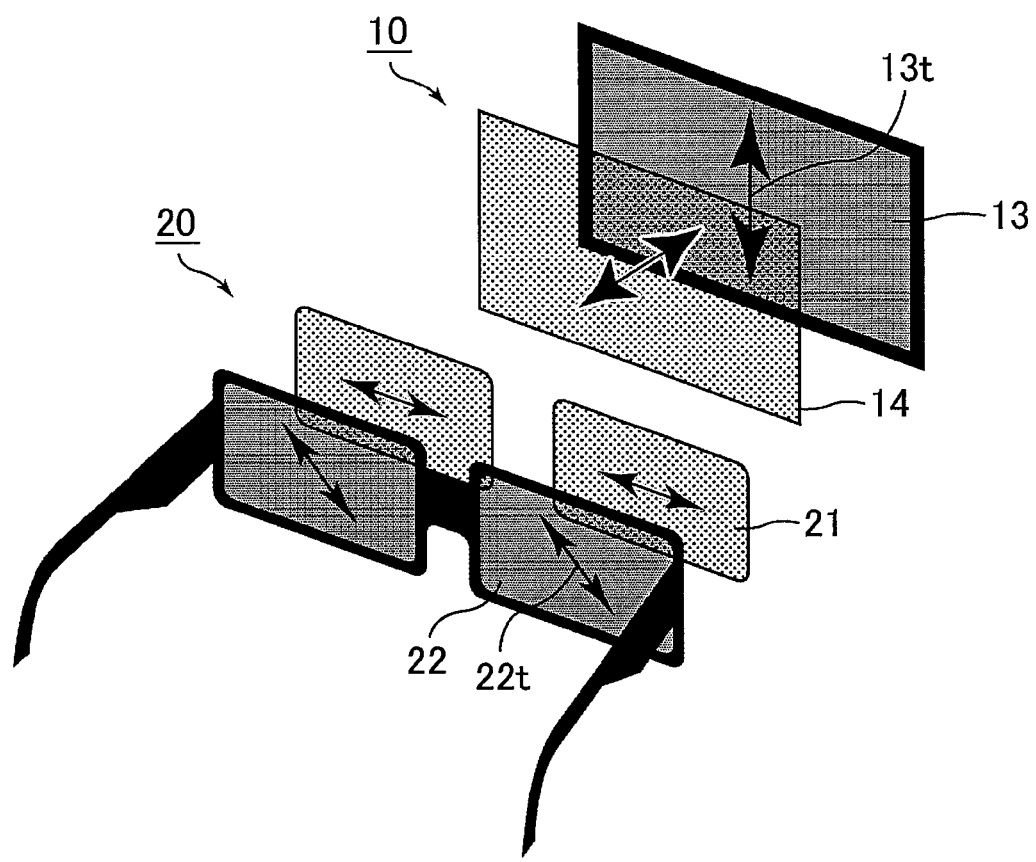
FIG. 1 is a schematic perspective view showing a configuration of a three-dimensional video recognition system of Embodiment 1.

In the present specification, the inner side and the outer side of active shutter glasses are defined such that the observer side when the glasses are worn is the inner side, and such that the side opposite to the observer side is the outer side.

Further, the front and back of the video display device is defined such that the observer side is the front side, and such that the side opposite to the observer side is the back side.

Further, the front and back of the front plate is defined such that the observer side is the front side, and such that the side opposite to the observer side, that is, the side of the video display device is the back side.

A linear polarizing element has a function of converting natural light (unpolarized light) or polarized light into linearly polarized light, and a "linear polarizing element", which is referred to in the present specification, means, unless otherwise noted, an element having only the polarizing function and not having a protective film.

In the present specification, a $\lambda/4$ plate is a layer having one-quarter wavelength retardation for at least light of a wavelength of 550 nm. The retardation of the $\lambda/4$ plate is, more precisely, 137.5 nm for light of a wavelength of 550 nm. However, the retardation of the $\lambda/4$ plate may be 100 nm or more and 180 nm or less, and is preferably 120 nm or more and 160 nm or less, and more preferably 130 nm or more and 145 nm or less.

An in-plane phase difference R is an in-plane phase difference (unit: nm) defined by $R=|nx-ny| \times d$, when principal refractive indexes in the in-plane direction of a birefringent layer (including a liquid crystal cell and a $\lambda/4$ plate) are defined as nx and ny, and a principal refractive index in the out-of-plane direction (thickness direction) is defined as nz, and when the thickness of the birefringent layer is defined as d. On the other hand, a thickness direction phase difference Rth is an out-of-plane (thickness direction) phase difference (unit: nm) defined by $Rth=(nz-(nx+ny)/2) \times d$.

In the present specification, a birefringent layer is a layer having an optical anisotropy. From the viewpoint of sufficiently obtaining the effect of the present invention, the birefringent layer means a layer in which one of the absolute value of the in-plane phase difference R and the absolute value of the thickness direction phase difference Rth is 10 nm or more and preferably a 20 nm or more.

Further, an isotropic film means a film in which both the absolute value of the in-plane phase difference R and the absolute value of the thickness direction phase difference Rth are 10 nm or less and preferably 5 nm or less.

The present invention will be mentioned in more detail referring to the drawings in the following embodiments, but is not limited to these embodiments.

Embodiment 1

As shown in FIG. 1, a three-dimensional video recognition system of a present embodiment is configured by including a video display device 10 and active shutter glasses 20.

A video signal for right eye and a video signal for left eye are alternately supplied to the display device 10, and right-eye and left-eye images having parallax therebetween are alternately displayed in a time division manner on the screen of the display device 10. The active shutter glasses 20 can alternately switch between a light transmitting state and a light shielding state (opening and closing states of the shutter) of the right and left lens sections. The switching timing is synchronized with the right-eye image and the left-eye image described above. Thereby, the right-eye image is projected on the viewer's right eye, and the left-eye image is projected on the viewer's left eye, as a result of which the viewer can recognize a three-dimensional video. In this way, each of the right and left lens sections of the glasses 20 may respectively function as shutter sections, and need not to function as a dioptric lens.

Further, the display device 10 includes a linear polarizing element 13 and a $\lambda/4$ plate 14 on the side of the observation surface in this order. The $\lambda/4$ plate 14 is bonded to the linear polarizing element 13 so that the relative angle between the axis of $\lambda/4$ plate 14 and the axis of the linear polarizing element 13 becomes about 45°. On the other hand, each of the active shutter glasses 20 includes a linear polarizing element 22 and a $\lambda/4$ plate 21 on the outer surface side in this order. Further, the $\lambda/4$ plate 21 is bonded to the linear polarizing element 22 so that the relative angle between the axis of the $\lambda/4$ plate 21 and the axis of the linear polarizing element 22 becomes about 45°. In this way, an optical system using a pair of circularly polarizing plates is introduced into the three-dimensional video recognition system of the present embodiment.

Thereby, light emitted from the screen of the display device 10 first becomes light linearly polarized in parallel to the transmission axis 13t of the linear polarizing element 13, and is then converted into circularly polarized light by the $\lambda/4$ plate 14. Then, the circularly polarized light is reconverted by the $\lambda/4$ plate 21 into light linearly polarized in parallel to the transmission axis 22t of the linear polarizing element 22. Then, the linearly polarized light enters into the linear polarizing element 22. In this way, the circularly polarized light with no specific polarization axis enters into the $\lambda/4$ plate 21, and hence, unlike the case where the $\lambda/4$ plates 14 and 21 are not provided, fixed screen brightness is obtained regardless of the relative orientation between the display device 10 and the glasses 20. This is based on the fact that, when two circularly polarizing elements having the same chirality are superimposed on each other, the transmissivity of the elements is fixed regardless of the relative angle between the axes of the elements.

Figure 2:
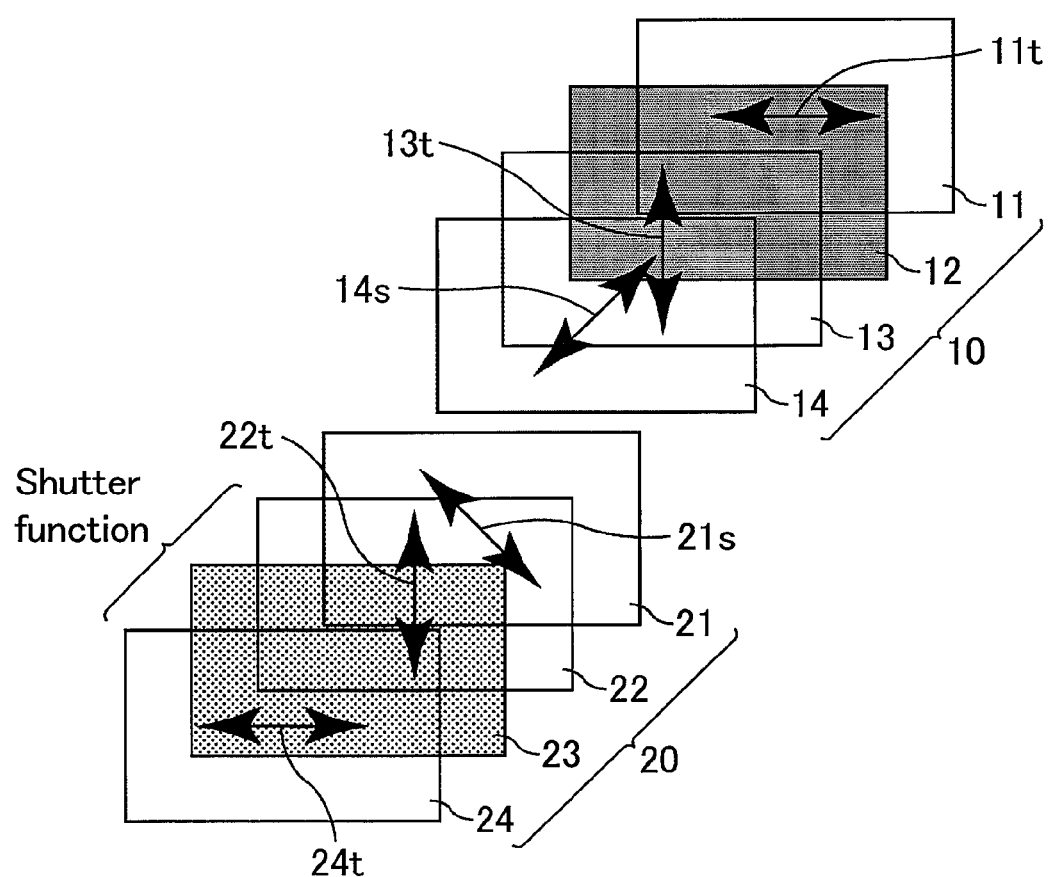
FIG. 2 is a schematic perspective view showing a configuration of the three-dimensional video recognition system of Embodiment 1.

In the following, a configuration of the three-dimensional video recognition system of the present embodiment is described in detail with reference to FIG. 2.

The video display device 10 is a transmission type liquid crystal display device and includes a backlight (not shown), a linear polarizing element (back polarizer) 11, a liquid crystal cell 12, the linear polarizing element (front polarizer) 13, and the λ/4 plate 14 in this order from a back surface side.

Each of the right and left lens sections (shutter sections) of the active shutter glasses 20 is provided with the λ/4 plate 21, the linear polarizing element (outer polarizer) 22, a liquid crystal cell 23, and a linear polarizing element (inner polarizer) 24 in this order from the outer surface side.

Then, when the angle formed between the transmission axis 22t of the linear polarizing element 22 and the in-plane slow axis 21s of the λ/4 plate 21 is defined as φ1, and when the angle formed between the transmission axis 13t of the linear polarizing element 13 and the in-plane slow axis 14s of the λ/4 plate 14 is defined as φ2, the three-dimensional video recognition system of the present embodiment satisfies the following expressions (1) and (2) or the following expressions (3) and (4).

$$40° \leq \phi1 \leq 50° \quad (1)$$

$$40° \leq \phi2 \leq 50° \quad (2)$$

$$130° \leq \phi1 \leq 140° \quad (3)$$

$$130° \leq \phi2 \leq 140° \quad (4)$$

However, φ1 is measured as viewed from the side of the λ/4 plate 21, and is measured in a counterclockwise direction taken as a positive direction with reference to a direction of the transmission axis 22t of the linear polarizing element 22. Similarly, φ2 is measured as viewed from the side of the λ/4 plate 14, and is measured in a counterclockwise direction taken as a positive direction with reference to a direction of the transmission axis 13t of the linear polarizing element 13.

A preferred range of φ1 is $42° \leq \phi1 \leq 48°$ or $132° \leq \phi1 \leq 138°$, and a more preferred range is $44° \leq \phi1 \leq 46°$ or $134° \leq \phi1 \leq 136°$. A preferred range of φ2 is $42° \leq \phi2 \leq 48°$ or $132° \leq \phi2 \leq 138°$, and a more preferred range is $44° \leq \phi2 \leq 46°$ or $134° \leq \phi2 \leq 136°$.

Examples of the linear polarizing elements 11, 13, 22 and 24 typically include an element in which an anisotropic material, such as an iodine complex having a dichroic property, is adsorbed and aligned on a polyvinyl alcohol (PVA) film. Usually, the linear polarizing element, in which a protective film, such as a triacetyl cellulose (TAC) film, is laminated on both sides of the PVA film in order to secure mechanical strength and wet heat resistance, is practically used.

The linear polarizing elements 11 and 13 are arranged in cross-Nicol, and the linear polarizing elements 22 and 24 are arranged in cross-Nicol. That is, the angle formed between the transmission axis 11t of the linear polarizing element 11 and the transmission axis 13t of the linear polarizing element 13 is set to approximately 90° (preferably 85° to 95°, and more preferably 88° to 92°). The angle formed between the transmission axis 22t of the linear polarizing element 22 and the transmission axis 24t of the linear polarizing element 24 is set to approximately 90° (preferably 85° to 95°, and more preferably 88° to 92°). However, the arrangement relationship between the transmission axes of the linear polarizing element 11 and the linear polarizing element 13 can be appropriately set according to the mode of the liquid crystal cell 12, and hence the linear polarizing element 11 and the linear polarizing element 13 may be arranged in parallel-Nicol. Further, the arrangement relationship between the transmission axes of the linear polarizing element 22 and the linear polarizing element 24 can be appropriately set according to the mode of the liquid crystal cell 23, and hence the linear polarizing element 22 and the linear polarizing element 24 may be arranged in parallel-Nicol.

The material and optical performance of the λ/4 plates 14 and 21 are not particularly limited, and, for example, a plate formed by extending a polymer film can be used. Examples of polymer include materials having a positive intrinsic birefringence, and more specifically include polycarbonate, polysulfone, polyether sulfone, polyethylene terephthalate, polyethylene, polyvinyl alcohol, norbornene, triacetyl cellulose, diacetyl cellulose, and the like.

The forming method of the λ/4 plates 14 and 21 is not particularly limited. However, each of the λ/4 plates 14 and 21 configures a circularly polarizing plate together with each of the linear polarizing elements 13 and 22, and hence each of the λ/4 plates 14 and 21 is laminated on each of the linear polarizing elements 13 and 22 so as to form a relative angle of about 45° between each of the λ/4 plates 14 and 21 and each of the linear polarizing elements 13 and 22. Therefore, it is particularly preferred that the λ/4 plates 14 and 21 are formed by an oblique stretching method in which a roll film is stretched and aligned in the direction oblique to the flowing direction of the roll film.

In this way, it is preferred that each of the λ/4 plates 14 and 21 is adjacent to each of the linear polarizing elements 13 and 22. That is, it is preferred that a birefringent layer is not provided between the λ/4 plate 14 and the linear polarizing element 13. Also, it is preferred that a birefringent layer is not provided between the λ/4 plate 21 and the linear polarizing element 22. Thereby, a desired circularly polarizing plate can be easily configured by the λ/4 plate 14 and the linear polarizing element 13, and also a desired circularly polarizing plate can be easily configured by the λ/4 plate 21 and the linear polarizing element 22. However, at this time, an isotropic film may be arranged between the λ/4 plate 14 and the linear polarizing elements 13 and between the λ/4 plate 21 and the linear polarizing element 22. Further, a birefringent layer may be provided between the λ/4 plate 14 and the linear polarizing element 13. Even in this case, the birefringence function of the birefringent layer is substantially cancelled by setting the slow axis of the birefringent layer in the direction substantially in parallel with or substantially perpendicular to the transmission axis of the linear polarizing element 13, and thereby it is possible to obtain the same effect as that in the case where the birefringent layer is not provided between the λ/4 plate 14 and the linear polarizing element 13. Similarly, a birefringent layer may be provided between the λ/4 plate 21 and the linear polarizing element 22. Even in this case, the birefringence function of the birefringent layer is substantially cancelled by setting the slow axis of the birefringent layer in the direction substantially in parallel with or substantially perpendicular to the transmission axis of the linear polarizing element 22, and thereby it is possible to obtain the same effect as that in the case where the birefringent layer is not provided between the λ/4 plate 21 and the linear polarizing element 22. Note that, in these cases, the substantially parallel state means preferably the state where the angle formed by both the axes is in the range of 0°±5°, and more preferably the state where the angle formed by both the axes is in the range of 0°±2°. Also, the substantially perpendicular state means preferably the state where the angle formed by both the axes is in the range of 90°±5°, and more preferably the state where the angle formed by both the axes is in the range of 90°±2°.

On the other hand, a birefringent layer may be appropriately provided between the linear polarizing element 11 and the linear polarizing element 13 for the purpose of optical compensation. For the same purpose, a birefringent layer may also be appropriately provided between the linear polarizing element 22 and the linear polarizing element 24.

Examples of the liquid crystal cell 12 include, but are not particularly limited to, liquid crystal cells having display modes, such as a vertical alignment (VA) mode, an in-plane switching (IPS) mode, and a field fringe switching (FFS) mode. The liquid crystal cell 12 includes two transparent substrates, a liquid crystal layer sandwiched between the two substrates, and a transparent electrode formed on at least one of the two substrates. Examples of the driving method of the liquid crystal cell 12 include, but are not particularly limited to, a simple matrix system (passive-matrix system), a plasma address system, and the like. Especially, a TFT system (active matrix system) is preferred.

Examples of the liquid crystal cell 23 are not particularly limited as long as they can secure a level of response speed that allows synchronization with the frame rate of the display device 10, and include liquid crystal cells having various display modes, such as, for example, a twisted nematic (TN) mode, and an optically compensated birefringence (OCB) mode. The liquid crystal cell 23 includes two transparent substrates, a liquid crystal layer sandwiched between the two substrates, and a transparent electrode formed on at least one of the two substrates.

As described above, in the present embodiment, a circular polarizer (the λ/4 plate 21 and the linear polarizing element 22) having constant transmissivity regardless of the polarization orientation of incident light (circularly polarized light) is provided on the outer surface side of the active shutter glasses 20, and further, in order to maximize the transmissivity, the polarization state of light emitted from the display device 10 is optimized so that the light becomes circularly polarized light. In this way, in the present embodiment, circularly polarized light is emitted from the display device 10, and circularly polarized light enters into the glasses 20. Therefore, even when the observer rotates his/her head portion (glasses 20), the display does not become dark, so that bright three-dimensional video can be always obtained without being accompanied by an increase in power consumption.

Further, in the present embodiment, the shutter function can be obtained by the linear polarizing element 22, the liquid crystal cell 23, and the linear polarizing element 24 of the glasses 20. For this reason, it is possible to always obtain an excellent shutter effect regardless of the relative relationship between the glasses 20 and the display device 10. That is, the cause (A), which is described above in association with the problem of the technique disclosed in Patent Document 2, is not generated. Further, the causes (B) and (C), which hinder the shutter effect and which are described above in association with the problem of the technique disclosed in Patent Document 2, are also not generated.

Note that the display device 10 is not limited to a liquid crystal display device, and examples thereof may include a plasma display, an organic or inorganic EL display, a CRT display, a projector, and the like, other than the liquid crystal display device. However, when the display device other than the liquid crystal display device is applied, the linear polarizing element 13 needs to be separately provided, which becomes a cause of cost increase. On the other hand, when a liquid crystal display device is applied as the display device 10, a conventional front polarizer can be used as the linear polarizing element 13, and hence the linear polarizing element 13 does not become a cause of cost increase.

Embodiment 2

Figure 3:
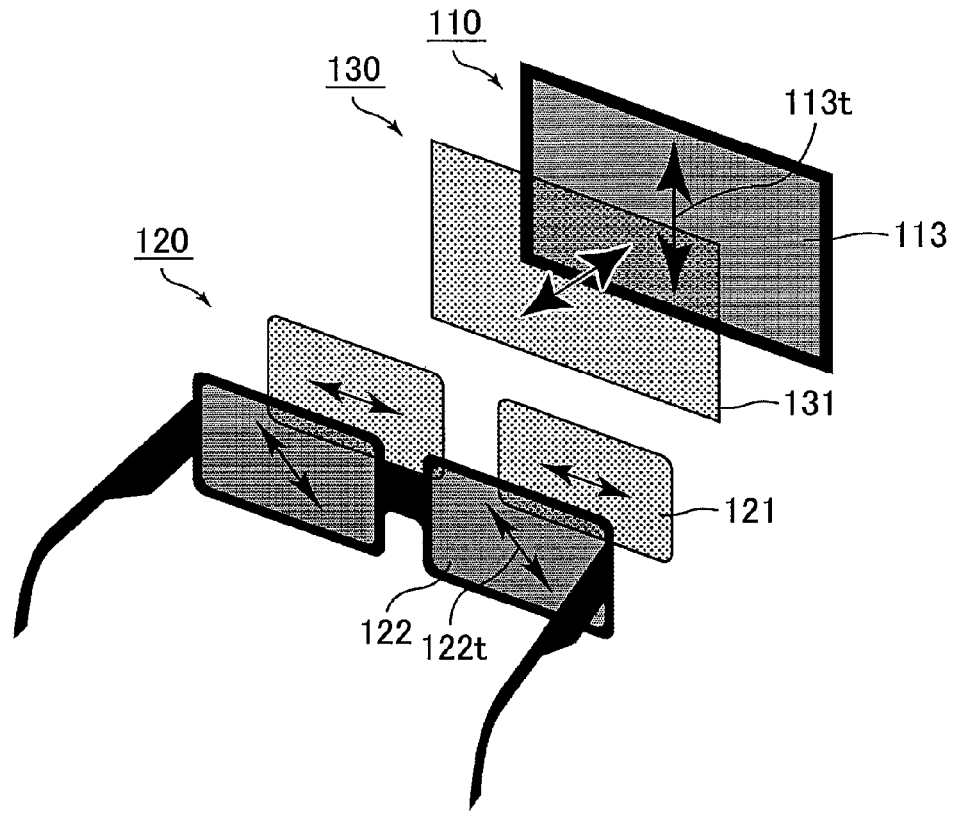
FIG. 3 is a schematic perspective view showing a configuration of a three-dimensional video recognition system of Embodiment 2.

As shown in FIG. 3, a three-dimensional video recognition system of a present embodiment is configured by including a video display device 110, active shutter glasses 120, and a front plate 130.

A video signal for right eye and a video signal for left eye are alternately supplied to the display device 110, and right-eye and left-eye images having parallax therebetween are alternately displayed in a time division manner on the screen of the display device 110. The active shutter glasses 120 can alternately switch between a light transmitting state and a light shielding state (opening and closing states of the shutter) of the right and left lens sections. The switching timing is synchronized with the right-eye image and the left-eye image described above. Thereby, the right-eye image is projected on the viewer's right eye, and the left-eye image is projected on the viewer's left eye, as a result of which the viewer can recognize a three-dimensional video. In this way, each of the right and left lens sections of the glasses 120 need only function as a shutter section, and need not function as a dioptric lens. The front plate 130 is a transparent member arranged on the front side of, that is, in front of the screen of the display device 110.

Further, the display device 110 includes a linear polarizing element 113 on the side of the observation surface. The front plate 130 includes a λ/4 plate 131 so that the λ/4 plate 131 and the linear polarizing element 113 are arranged in parallel with each other. Further, the relative angle between the axis of the λ/4 plate 131 and the axis of the linear polarizing element 113 is set to about 45°. On the other hand, each of the active shutter glasses 120 includes a linear polarizing element 122 and a λ/4 plate 121 in this order on the outer surface side. Further, the λ/4 plate 121 is bonded to the linear polarizing element 122 so that the relative angle between the axis of the λ/4 plate 121 and the axis of the linear polarizing element 122 becomes about 45°. In this way, an optical system using a pair of circularly polarizing plates is introduced into the three-dimensional video recognition system of the present embodiment.

Thereby, light emitted from the screen of the display device 110 first becomes light linearly polarized in parallel to the transmission axis 113$t$ of the linear polarizing element 113, and is then converted into circularly polarized light by the λ/4 plate 131. Then, the circularly polarized light is reconverted by the λ/4 plate 121 into light linearly polarized in parallel to the transmission axis 122$t$ of the linear polarizing element 122. Then, the linearly polarized light enters into the linear polarizing element 122. In this way, the circularly polarized light with no specific polarization axis enters into the λ/4 plate 121, and hence, unlike the case where the λ/4 plates 131 and 121 are not provided, fixed screen brightness is obtained regardless of the relative orientation between the display device 110 and the glasses 120. This is based on the fact that, when two circularly polarizing elements having the same chirality are superimposed on each other, the transmissivity of the elements is fixed regardless of the relative angle between the axes of the elements.

Figure 4:
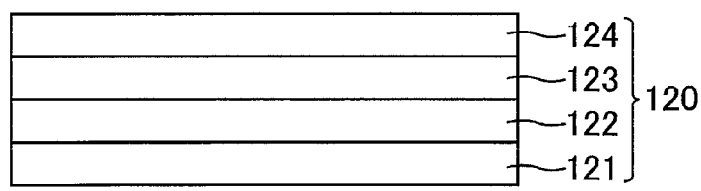
FIG. 4 is a schematic cross-sectional view showing a configuration of the three-dimensional video recognition system of Embodiment 2.
Figure 4:
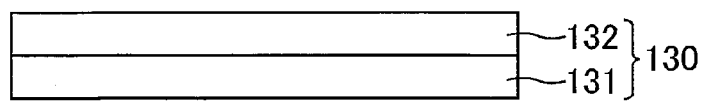
Figure 4:
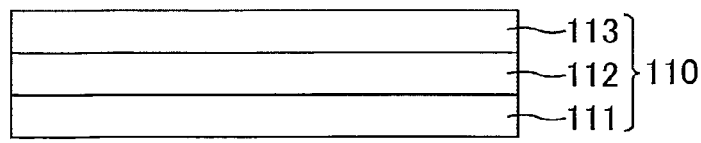
Figure 5:
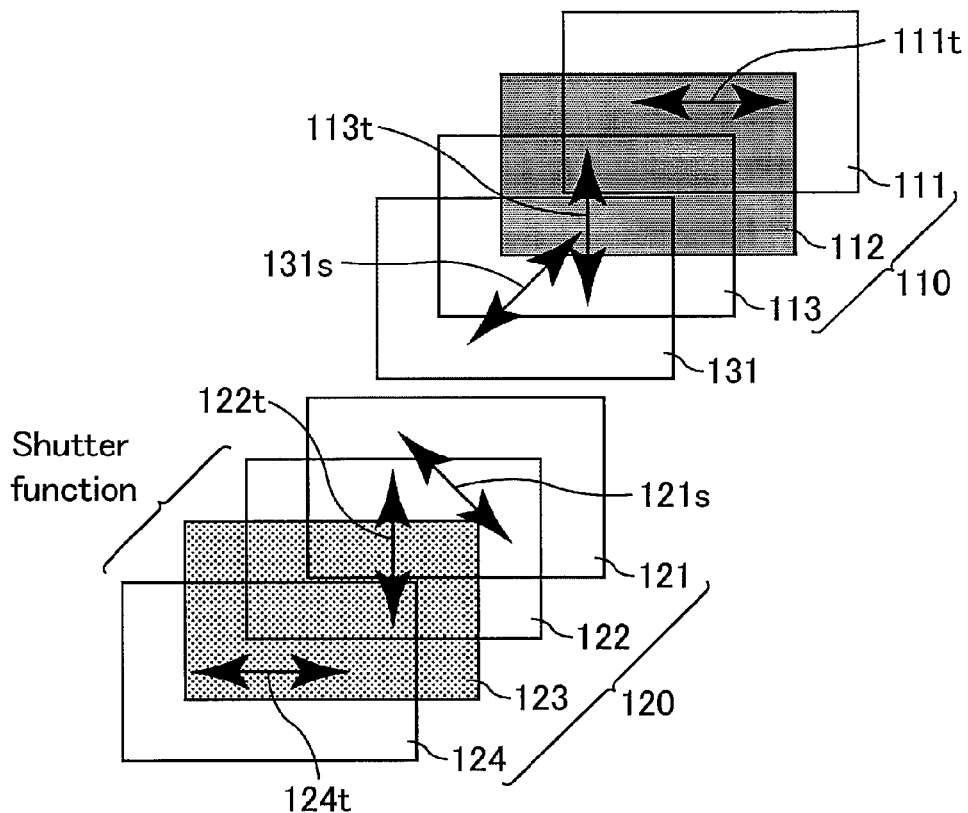
FIG. 5 is a schematic perspective view showing a configuration of the three-dimensional video recognition system of Embodiment 2.

In the following, a configuration of the three-dimensional video recognition system of the present embodiment is described in detail with reference to FIG. 4 and FIG. 5.

The video display device 110 is a transmission type liquid crystal display device and includes a backlight (not shown), a linear polarizing element (back polarizer) 111, a liquid crystal cell 112, and the linear polarizing element (front polarizer) 113 in this order from the back surface side.

The front plate 130 includes the λ/4 plate 131 and a transparent protective plate 132, and the λ/4 plate 131 and the protective plate 132 are laminated in this order from the side of the display device 110. Since the front plate 130 is arranged, the design of the display device 110 can be improved, and the full flat state of the outermost surface of the display device 110 can be obtained. Further, since the protective plate 132 is arranged, the display device 110 can be protected from various shocks. The λ/4 plate 131 and the protective plate 132 are bonded together by a bonding material or an adhesive.

Each of the right and left lens sections (shutter sections) of the active shutter glasses 120 is provided with the λ/4 plate 121, the linear polarizing element (outer polarizer) 122, a liquid crystal cell 123, and a linear polarizing element (inner polarizer) 124 in this order from the outer surface side.

Then, when the angle formed between the transmission axis 122t of the linear polarizing element 122 and the in-plane slow axis 121s of the λ/4 plate 121 is defined as ϕ1, and when the angle formed between the transmission axis 113t of the linear polarizing element 113 and the in-plane slow axis 131s of the λ/4 plate 131 is defined as ϕ2, the three-dimensional video recognition system of the present embodiment satisfies the following expressions (1) and (2) or the following expressions (3) and (4).

$$40° \leq \phi1 \leq 50° \quad (1)$$

$$40° \leq \phi2 \leq 50° \quad (2)$$

$$130° \leq \phi1 \leq 140° \quad (3)$$

$$130° \leq \phi2 \leq 140° \quad (4)$$

However, ϕ1 is measured as viewed from the side of the λ/4 plate 121, and is measured in a counterclockwise direction taken as a positive direction with reference to a direction of the transmission axis 122t of the linear polarizing element 122. Similarly, ϕ2 is measured as viewed from the side of the λ/4 plate 131, and is measured in a counterclockwise direction taken as a positive direction with reference to a direction of the transmission axis 113t of the linear polarizing element 113.

A preferred range of ϕ1 is 42°≤ϕ1≤48° or 132°≤ϕ1≤138°, and a more preferred range is 44°≤ϕ1≤46° or 134°≤ϕ1≤136°. A preferred range of ϕ2 is 42°≤ϕ2≤48° or 132°≤ϕ2≤138°, and a more preferred range is 44°≤ϕ2≤46° or 134°≤ϕ2≤136°.

Examples of the linear polarizing elements 111, 113, 122 and 124 typically include an element in which an anisotropic material, such as an iodine complex having a dichroic property, is adsorbed and aligned on a polyvinyl alcohol (PVA) film. Usually, the linear polarizing element, in which a protective film, such as a triacetyl cellulose (TAC) film, is laminated on both sides of the PVA film in order to secure mechanical strength and wet heat resistance, is practically used.

The linear polarizing elements 111 and 113 are arranged in cross-Nicol, and the linear polarizing elements 122 and 124 are arranged in cross-Nicol. That is, the angle between the transmission axis 111t of the linear polarizing element 111 and the transmission axis 113t of the linear polarizing element 113 is set to approximately 90° (preferably 85° to 95°, more preferably 88° to 92°). The angle between the transmission axis 122t of the linear polarizing element 122 and the transmission axis 124t of the linear polarizing element 124 is set to approximately 90° (preferably 85° to 95°, more preferably 88° to 92°). However, the arrangement relationship between the transmission axes of the linear polarizing element 111 and the linear polarizing element 113 can be appropriately set according to the mode of the liquid crystal cell 112, and hence the linear polarizing element 111 and the linear polarizing element 113 may be arranged in parallel-Nicol. Further, the arrangement relationship between the transmission axes of the linear polarizing element 122 and the linear polarizing element 124 can be appropriately set according to the mode of the liquid crystal cell 123, and hence the linear polarizing element 122 and the linear polarizing element 124 may be arranged in parallel-Nicol.

The material and optical performance of the λ/4 plates 131 and 121 are not particularly limited, and, for example, a plate formed by extending a polymer film can be used. Examples of polymer include materials having a positive intrinsic birefringence, and more specifically include polycarbonate, polysulfone, polyether sulfone, polyethylene terephthalate, polyethylene, polyvinyl alcohol, norbornene, triacetyl cellulose, diacetyl cellulose, and the like.

The forming method of the λ/4 plates 121 is not particularly limited. However, the λ/4 plate 121 configures a circularly polarizing plate together with the linear polarizing elements 122, and hence the λ/4 plate 121 is laminated on the linear polarizing element 122 so as to form a relative angle of about 45° between the λ/4 plate 121 and the linear polarizing element 122. Therefore, it is particularly preferred that the λ/4 plate 121 is formed by an oblique stretching method in which a roll film is stretched and aligned in the direction oblique to the flowing direction of the roll film.

In this way, it is preferred that the λ/4 plate 121 is adjacent to the linear polarizing element 122. That is, it is preferred that a birefringent layer is not provided between the λ/4 plate 121 and the linear polarizing element 122. Thereby, a desired circularly polarizing plate can be easily configured by the λ/4 plate 121 and the linear polarizing element 122. However, at this time, an isotropic film may be arranged between the λ/4 plate 121 and the linear polarizing element 122. Further, a birefringent layer may be provided between the λ/4 plate 121 and the linear polarizing element 122. Even in this case, the birefringence function of the birefringent layer is substantially cancelled by setting the slow axis of the birefringent layer in the direction substantially in parallel with or substantially perpendicular to the transmission axis of the linear polarizing element 122, and thereby it is possible to obtain the same effect as that in the case where the birefringent layer is not provided between the λ/4 plate 121 and the linear polarizing element 122. Note that, in this case, the substantially parallel state means preferably the state where the angle formed by both the axes is in the range of 0°±5°, and more preferably the state where the angle formed by both the axes is in the range of 0°±2°. Also, the substantially perpendicular state means preferably the state where the angle formed by both the axes is in the range of 90°±5°, and more preferably the state where the angle formed by both the axes is in the range of 90°±2°.

Examples of the liquid crystal cell 112 include, but are not particularly limited to, liquid crystal cells having display modes, such as the VA mode, the IPS mode, and the FFS mode. The liquid crystal cell 112 includes two transparent substrates, a liquid crystal layer sandwiched between the two substrates, and a transparent electrode formed on at least one of the two substrates. Examples of the driving method of the liquid crystal cell 112 include, but are not particularly limited to, a simple matrix system (passive-matrix system), a plasma address system, and the like. Especially, a TFT system (active matrix system) is preferred.

Examples of the liquid crystal cell 123 are not particularly limited as long as they can secure a level of response speed that allows synchronization with the frame rate of the display device 110, and examples thereof include liquid crystal cells having display modes, such as the TN mode, and the OCB mode. The liquid crystal cell 123 includes two transparent substrates, a liquid crystal layer sandwiched between the two substrates, and a transparent electrode formed on at least one of the two substrates.

As the material of the protective plate 132, a material having high transparency and high mechanical strength is preferred, and examples thereof include strengthened glass, and a resin made of polycarbonate, acrylic, and the like.

The forming method of the λ/4 plate 131 and the protective plate 132 is not particularly limited, and can be formed by conventional methods.

The configuration between the display device 110 and the front plate 130 is not particularly limited unless the polarization state of light emitted from the display device 110 is not significantly changed. There may or may not be an air layer between the display device 110 and the front plate 130. Further, there may be a layer of a bonding material or an adhesive between the display device 110 and the front plate 130. Further, there may be an isotropic film between the display device 110 and the front plate 130. Also, there may be a birefringent layer between the display device 110 and the front plate 130. Even in this case, the birefringence function of the birefringent layer is substantially cancelled by setting the slow axis of the birefringent layer in the direction substantially in parallel with or substantially perpendicular to the transmission axis of the linear polarizing element 113, and thereby it is possible to obtain the same effect as that in the case where the birefringent layer is not provided between the λ/4 plate 131 and the linear polarizing element 113. Note that, in this case, the substantially parallel state means preferably the state where the angle formed by both the axes is in the range of 0°±5°, and more preferably the state where the angle formed by both the axes is in the range of 0°±2°. Also, the substantially perpendicular state means preferably the state where the angle formed by both the axes is in the range of 90°±5°, and more preferably the state where the angle formed by both the axes is in the range of 90°±2°.

On the other hand, a birefringent layer may be appropriately provided between the linear polarizing element 111 and the linear polarizing element 113 for the purpose of optical compensation. From the same purpose, a birefringent layer may be appropriately provided between the linear polarizing element 122 and the linear polarizing element 124.

As described above, in the present embodiment, a circular polarizer (the λ/4 plate 121 and the linear polarizing element 122) having a constant transmissivity regardless of the polarization orientation of incident light (circularly polarized light) is provided on the outer surface side of the active shutter glasses 120, and further, in order to maximize the transmissivity, the polarization state of the light emitted from the display device 110 is optimized so that the light becomes circularly polarized light. In this way, in the present embodiment, circularly polarized light is emitted from the display device 110 and the front plate 130, so as to enter into the glasses 120. Therefore, even when the observer rotates his/her head portion (glasses 120), the display does not become dark, so that bright three-dimensional video can always be obtained without being accompanied by an increase in power consumption.

Further, in the present embodiment, the shutter function can be obtained by the linear polarizing element 122, the liquid crystal cell 123, and the linear polarizing element 124 of the glasses 120. For this reason, it is possible to always obtain excellent shutter effect regardless of the relative relationship between the glasses 120 and the display device 110. That is, the cause (A), which is described above in association with the problem of the technique disclosed in Patent Document 2, is not generated. Further, the causes (B) and (C), which hinder the shutter effect and which are described above in association with the problem of the technique disclosed in Patent Document 2, are not generated.

Note that the display device 110 is not limited to a liquid crystal display device, and examples thereof may include a plasma display, an organic or inorganic EL display, a CRT display, a projector, and the like, other than the liquid crystal display device. However, when the display device other than the liquid crystal display device is applied, the linear polarizing element 113 needs to be separately provided, which becomes a cause of cost increase. On the other hand, when a liquid crystal display device is applied as the display device 110, a conventional front polarizer can be used as the linear polarizing element 113, and hence the linear polarizing element 113 does not become a cause of cost increase.

Further, since the λ/4 plate 131 is provided on the front plate 130, the polarizer of the conventional liquid crystal display device can be used as the polarizer of the display device 110. That is, when the display device 110 is a liquid crystal display device, the conventional liquid crystal display device can be used as it is as the display device 110. For this reason, the cost can be further reduced as compared with the configuration in which the λ/4 plate is bonded onto the front polarizer of the liquid crystal display device.

Embodiment 3

Figure 6:
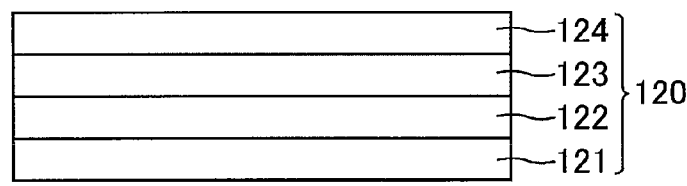
FIG. 6 is a schematic cross-sectional view showing a configuration of a three-dimensional video recognition system of Embodiment 3.
Figure 6:
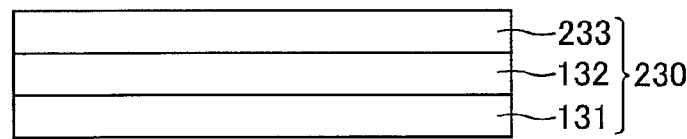
Figure 6:
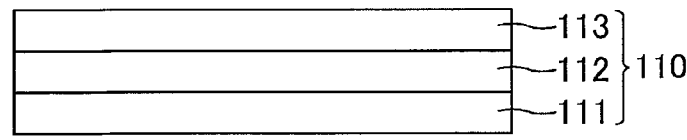

As shown in FIG. 6, a three-dimensional video recognition system of a present embodiment has the same configuration as that of the three-dimensional video recognition system of Embodiment 2 except that a front plate 230 is included instead of the front plate 130.

The front plate 230 further includes a surface treatment film 233 on the front surface side of the protective plate 132. The λ/4 plate 131, the protective plate 132, and the surface treatment film 233 are laminated in this order from the side of the display device 110. The protective plate 132 and the surface treatment film 233 are bonded together by a bonding material or an adhesive.

The surface treatment film 233 is a film, on the surface of which a surface treatment layer is formed, and examples thereof generally include the following three films. The first film is a film (hard coat film) on the surface of which a hard court layer for damage prevention is formed, and the second is a film (AG film) on the surface of which an anti-glare (AG) layer is formed, and the third film is a film (anti-reflection film) on the surface of which an anti-reflection layer is formed to reduce the surface reflection.

Further, examples of the anti-reflection layer include an anti-reflection (AR) layer having low reflectance, a low reflection (LR) layer having reflectance higher than that of the AR layer, a moth-eye layer, and the like.

The hard coat film includes a transparent base film (for example, plastic film). A hard coat layer is formed on the surface of the transparent base film. Thereby, the film surface can be made hard.

Examples of the forming method of the hard coat layer include methods, such as a method for coating a curable resin, such as organosiloxane-based resin, and melamine-based resin, a method for forming a metal thin film by a vacuum vapor deposition method, a sputtering method, or the like, and a method for coating a multifunctional acrylate-based active energy ray-curable resin. Especially, the method using active energy ray-curable resin is preferred from the viewpoints of the ease of large area processing and excellent productivity.

Further, examples of the hard coat film include a hard coat film in which a hard coat layer is laminated on a plastic base material via a buffer layer (film described in JP 11-300873A), a hard coat film having a two-layer structure in which a cured resin layer made of a mixture of radical curable resin and cation curable resin is used as the lower layer, and in which a cured resin layer made only of radical curable resin is used as the upper (film described in JP 2000-71392A), a hard coat film including a hard coat layer having a laminated structure in which the upper layer has a universal hardness larger than that of the lower layer (film described in JP 2002-36436A), a hard coat film in which a second hard coat layer is laminated on a plastic base material via a first hard coat layer, in which the first hard coat layer contains curable epoxy acrylate, and in which the second hard coat layer contains curable urethane acrylate (film described in JP 2006-058574A), and the like.

The AG film includes a transparent base film (for example, plastic film), and an AG layer is formed on the surface of the transparent base film. Thereby, light is diffused on the film surface, so that anti-glare property can be given.

Depressions and projections are formed on the surface on the front surface side of the AG layer. The haze of the AG film is preferably 3 to 30%, more preferably 5 to 20%, and still more preferably 7 to 20%.

Examples of the method for forming the depressions and projections preferably include a method for adding fine particles (for example, a method described in JP 2000-271878A), a method for adding a small amount (0.1 to 50 mass %) of comparatively large particles (particle diameter of 0.05 to 2 μm) (for example, methods described in JP 2000-281410A, JP 2000-95893A, JP 2001-100004A, or JP 2001-281407A), a method for physically forming depressions and projections on the film surface (for example, methods described, as emboss processing methods, in JP 63-278839A, JP 11-183710A, JP 2000-275401A), and the like.

The anti-reflection film includes a transparent base film (for example, plastic film). The LR layer, the AR layer, or the moth-eye layer is formed on the surface of the transparent base film. Thereby, the reflection on the film surface can be suppressed.

The haze of the anti-reflection film is preferably 5% or less, and more preferably 3% or less. The anti-reflection film has a hardness of H or higher in the pencil hardness test based on JIS (Japanese Industrial Standards) K5400, more preferably 2H or higher and still more preferably 3H or higher.

The LR layer is made of a single layer of a low refractive index layer, and the material of low refractive index layer contains a low refractive index material, such as fluorine-containing resin. The refractive index of the low refractive index layer is preferably 1.20 to 1.55, and more preferably 1.30 to 1.50.

Further, the low refractive index layer is located at the position of the outermost layer of the anti-reflection film, and preferably has abrasion resistance and stain resistance. A material containing a silicone group, fluoride, or the like, may be used as the material of the low refractive index layer. Thereby, the sliding property can be given to the surface of the anti-reflection film, so that the abrasion resistance of the anti-reflection film can be improved.

As the material containing fluoride, for example, compounds described in the paragraph numbers of [0018] to of JP 9-222503A, compounds described in the paragraph numbers of [0019] to [0030] of JP 11-38202A, compounds described in the paragraph numbers of [0027] to of JP 2001-40284A, and compounds described in JP 2000-284102A are preferred.

As the material containing a silicone group, a compound containing a polysiloxane structure is preferred. On the other hand, reactive silicone (for example, Silaplane manufactured by Chisso Corporation), polysiloxane containing a silanol group at both ends (compound described in JP 11-258403A), and the like, can also be used.

Further, the low refractive index layer may be formed in such a manner that, in the presence of catalyst, an organic metallic compound, such as a silane coupling agent, is condensation reacted with a silane coupling agent containing a specific fluorine-containing hydrocarbon group, so as to be cured. Examples of the material of the low refractive index layer include a compound described in JP 58-142958A, a compound described in JP 58-147483A, a compound described in JP 58-147484A, a compound described in JP 9-157582A, a compound described in JP 11-106704A, a compound described in JP 2000-117902A, a compound described in JP 2001-48590A, a compound described in JP 2002-53804A, and the like.

The low refractive index layer may contain, as an additive, a filler, a silane coupling agent, a sliding agent, a surfactant, and the like, other than the above-described compounds. Examples of the filler include low refractive index inorganic fine particles having an average primary particle diameter of about 1 to 150 nm, organic fine particles described in the paragraph numbers of [0020] to [0038] of JP 11-3820A, and the like. The inorganic fine particles contain silicon dioxide, a fluorine-containing compound, or the like, and examples of the fluorine-containing compound include magnesium fluoride, calcium fluoride, barium fluoride, and the like.

The low refractive index layer may be formed by a gas phase method (such as, for example, a vacuum vapor deposition method, a sputtering method, an ion plating method, a plasma CVD method), but is preferably formed by a coating method from the viewpoint of reducing the manufacturing cost. As the coating method, a dip coating method, an air knife coating method, a curtain coating method, a roller coating method, a wire bar coating method, a gravure coating method, a micro gravure method are preferred.

The thickness of the low refractive index layer is preferably in the range of 30 to 200 nm, more preferably in the range of 50 to 150 nm, and still more preferably in the range of 60 to 120 nm.

The AR layer has a laminated structure of a low refractive index layer and a high refractive index layer having a refractive index higher than that of the low refractive index layer. The AR layer may further include an intermediate refractive index layer having a refractive index between the refractive index of the low refractive index layer, and the refractive index of the high refractive index layer.

Each of the intermediate refractive index layer and the high refractive index layer contains ultrafine particles having a large refractive index and having an average particle diameter of 100 nm or less, and a matrix material. It is preferred that the ultrafine particles are dispersed in the matrix material. As a material of the ultrafine particles, an inorganic compound is preferred. More specifically, an inorganic compound, such as, for example, an oxide of Ti, Zn, Sb, Sn, Zr, Ce, Ta, La, In, or the like, having a refractive index of 1.65 or more, and a composite oxide containing these metal atoms, are preferred.

The surface of such ultrafine particles may be treated by a surface treatment agent. Specifically, the surface of the ultrafine particles may be treated by an agent, such as a silane coupling agent described in JP 11-295503A, a silane coupling agent described in JP 11-153703A, a silane coupling agent described in JP 2000-9908A, or an anionic compound or an organic metal coupling agent described in JP 2001-310432A.

Further, the ultrafine particle may have a core-shell structure using a high refractive index particle as the core as described in JP 2001-166104A.

Further, the ultrafine particles may be used in combination with a specific dispersing agent as described in, for example, JP 11-153703A, U.S. Pat. No. 6,210,858, JP 2002-277609A, and the like.

As the matrix material, conventionally known materials, such as thermoplastic resin, and curable resin coating film, can be used. Further, as the matrix material, materials, such as a multifunctional material described in JP 2000-47004A, a multifunctional material described in JP 2001-315242A, a multifunctional material described in JP 2001-31871A, a multifunctional material described in JP 2001-296401A, and a metal alkoxide composition described in JP 2001-293818A, can also be used.

The refractive index of the high refractive index layer is preferably in the range of 1.70 to 2.20. The thickness of the high refractive index layer is preferably in the range of 5 nm to 10 μm, and more preferably in the range of 10 nm to 1 μm.

The refractive index of the intermediate refractive index layer is adjusted to become a value between the refractive index of the low refractive index layer, and the refractive index of the high refractive index layer. The refractive index of the intermediate refractive index layer is preferably in the range of 1.50 to 1.70.

Finally, the moth-eye layer is described.

A large number of protrusions smaller than the wavelength (380 to 780 nm) of visible light are formed on the front side surface of the moth-eye layer. Thereby, it is possible to obtain a very excellent effect of suppressing the surface reflection.

Figure 7:
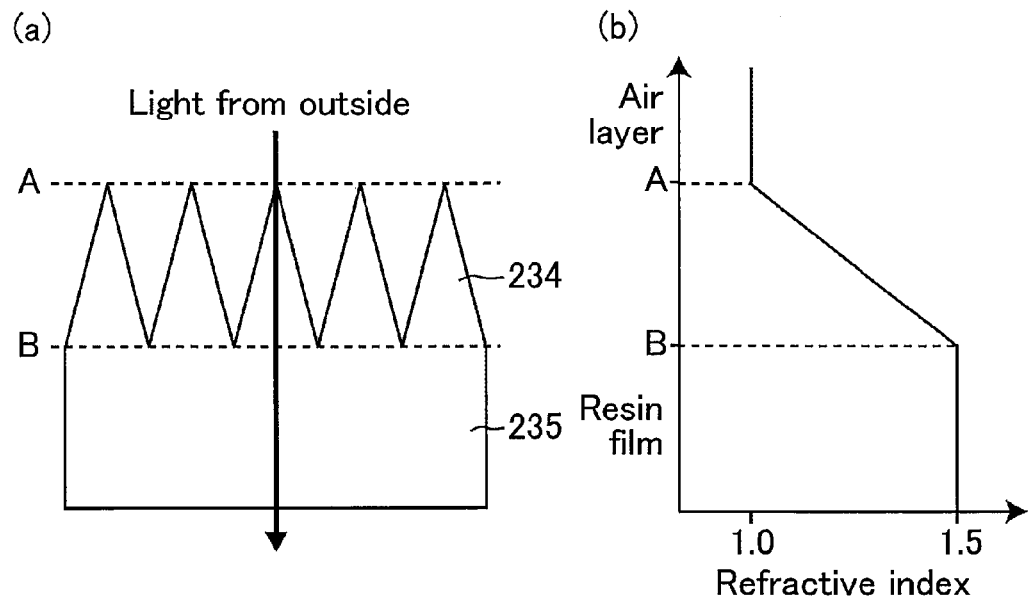
FIG. 7(a) is an enlarged schematic view showing a cross section of an antireflection film having a moth-eye layer.
FIG. 7(b) is an illustration for explaining a change of refractive index in the boundary surface between the antireflection film and the air layer.

The principle of suppressing the surface reflection is described with reference to FIG. 7.

As shown in FIG. 7(a), the light incident on the moth-eye layer reaches a base film 235 via fine protrusions 234 provided on the surface of the moth-eye layer. For this reason, the region (region between A and B in the figure), which is located between the air layer and the film 235 and in which the protrusions 234 and the air layer mixedly exist, can be regarded as a region having an intermediate refractive index between the refractive index of the material of the film 235 (about 1.5 in the case of a resin film), and the refractive index of air (1.0). That is, as shown in FIG. 7(b), in correspondence with the change in the volume ratio of the protrusion 234 and the air layer, the refractive index of this region is continuously and gradually increased from the refractive index of the air in contact with the surface of the moth-eye layer to the refractive index of the material of the film 235 within the distance shorter than the wavelength of visible light. As a result, the light incident on the anti-reflection film having the moth-eye layer is prevented from recognizing the boundary surface between the air and the film as a boundary surface between media having different refractive indexes, and hence the reflection of light at the boundary surface can be significantly reduced. For example, the surface reflection rate of visible light can be reduced to about 0.15%.

Specific examples of the antireflection film having the moth-eye layer include a resin film, on the surface of which a large number of substantially conically shaped protrusions having a height of about 200 nm (preferably 100 to 400 nm, more preferably 150 to 300 nm) and having the inter-vertex distance of about 200 nm (preferably 50 to 300 nm, more preferably 100 to 200 nm) are formed.

An example of the manufacturing method of the antireflection film having the moth-eye layer includes a so-called nano-imprint technique, that is, a technique of transferring the shapes of depressions and projections of nano-metric size (1 to 1000 nm) engraved on a metal mold, to a resin material applied on the substrate by pressing the metal mold onto the resin material. Examples of the method for curing the resin material in the nano-imprint technique include a thermal nano-imprint technique, a UV nano-imprint technique, and the like. The UV nano-imprint technique is a technique in which a moth-eye structure thin film that has a shape inverted from the shape formed on the metal mold is formed on a base film in such a manner that a thin film made of ultraviolet curable resin is formed on the base film, and that the metal mold is pressed onto the thin film and then ultraviolet rays are irradiated onto the thin film.

As described above, with the present embodiment, it is possible to obtain the effect of the surface treatment film 233 described above, in addition to the effect described in Embodiment 2.

Embodiment 4

Figure 8:
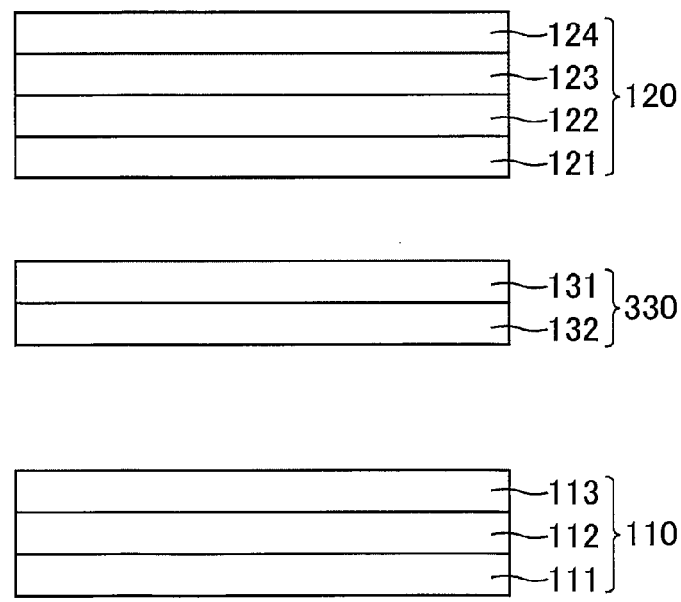
FIG. 8 is a schematic cross-sectional view showing a configuration of a three-dimensional video recognition system of Embodiment 4.

As shown in FIG. 8, a three-dimensional video recognition system according to a present embodiment has the same configuration as that of the three-dimensional video recognition system of Embodiment 2 except that the arrangement positions of the protective plate 132 and the λ/4 plate 131 are different.

In a front plate 330 according to the present embodiment, the protective plate 132, and the λ/4 plate 131 are laminated in this order from the side of the display device 110.

With the present embodiment, it is possible to obtain the same effect as that described in Embodiment 2.

Embodiment 5

Figure 9:
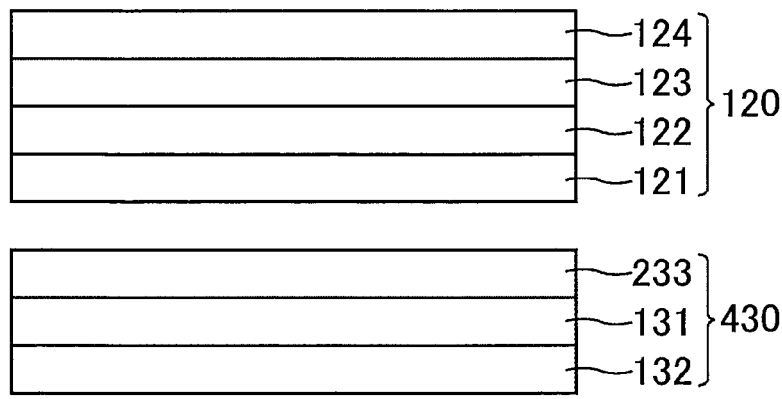
FIG. 9 is a schematic cross-sectional view showing a configuration of a three-dimensional video recognition system of Embodiment 5.

As shown in FIG. 9, a three-dimensional video recognition system of a present embodiment has the same configuration as that of the three-dimensional video recognition system of Embodiment 3 except that the arrangement positions of the protective plate 132 and the λ/4 plate 131 are different.

In a front plate 430 according to the present embodiment, the protective plate 132, the λ/4 plate 131, and the surface treatment film 233 are laminated in this order from the side of the display device 110.

With the present embodiment, it is possible to obtain the same effect as that described in Embodiment 3.

Further, the λ/4 plate 131, and the surface treatment film 233 are arranged together on one side of the protective plate 132. Thereby, a film lamination process can be simplified, and hence the cost can be reduced.

Embodiment 6

Figure 10:
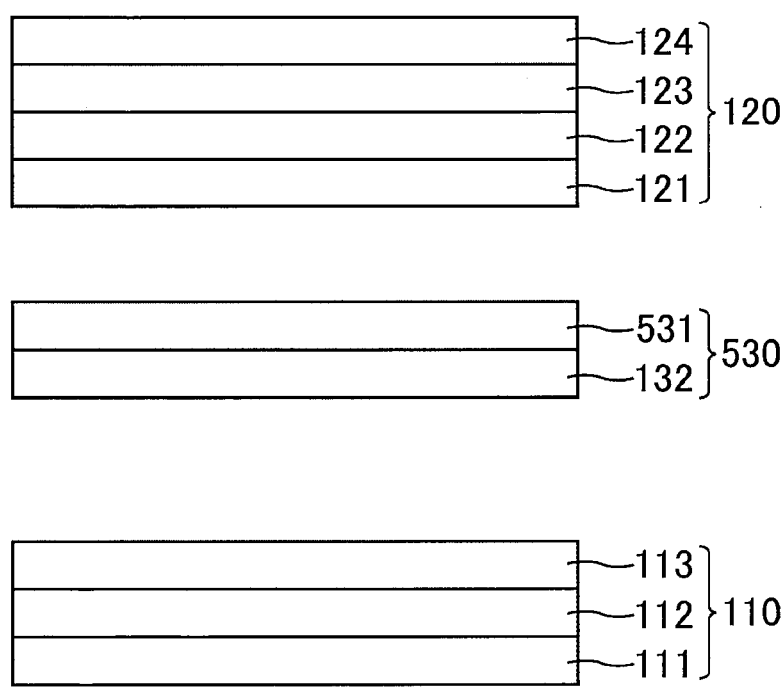
FIG. 10 is a schematic cross-sectional view showing a configuration of a three-dimensional video recognition system of Embodiment 6.

As shown in FIG. 10, a three-dimensional video recognition system of a present embodiment has the same configuration as that of the three-dimensional video recognition system of Embodiment 4 except that a λ/4 plate 531 provided with a surface treatment layer is included instead of the λ/4 plate 131.

In a front plate 530 according to the present embodiment, the protective plate 132, and the λ/4 plate 531 are laminated in this order from the side of the display device 110. The protective plate 132 and the λ/4 plate 531 are bonded together by a bonding material or an adhesive.

The λ/4 plate 531 is formed by treating the surface on the front side of the λ/4 plate 131 similarly to the surface treatment film 233. That is, the hard coat layer, the anti-glare layer, or the anti-reflection layer (AR layer, LR layer, or moth-eye layer) is formed directly on the surface of the λ/4 plate 531.

With the present embodiment, it is possible to obtain the same effect as that described in Embodiment 3.

Embodiment 7

Figure 11:
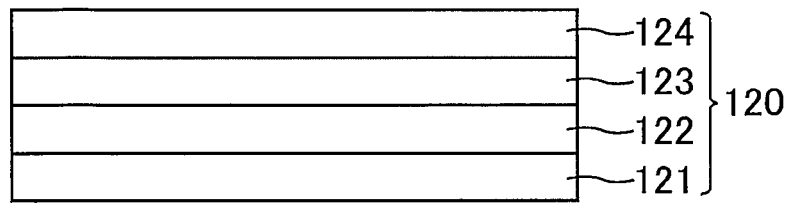
FIG. 11 is a schematic cross-sectional view showing a configuration of a three-dimensional video recognition system of Embodiment 7.
Figure 11:
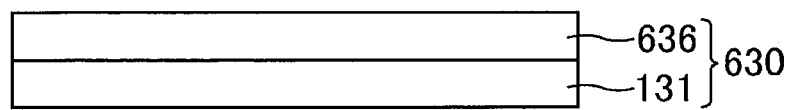
Figure 11:
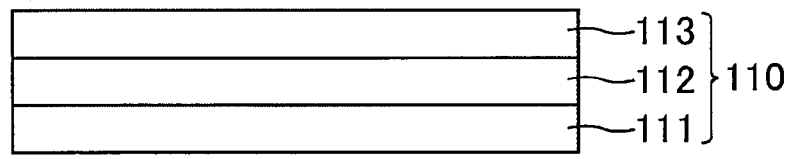

As shown in FIG. 11, a three-dimensional video recognition system of a present embodiment has the same configuration as that of the three-dimensional video recognition system of Embodiment 2 except that a touch panel 636 is included instead of the protective plate 132.

A front plate 630 according to the present embodiment includes the λ/4 plate 131 and the touch panel 636 which are laminated in this order from the side of the display device 110. The λ/4 plate 131 and the touch panel 636 are bonded together by a bonding material or an adhesive.

The touch panel 636 is an input device for inputting various kinds of information, and the information can be inputted by touching (pressing) the surface of the touch panel while viewing through the screen of the display device 110. In this way, with the touch panel 636, it is possible to interactively and intuitively operate the display device 110 only by touching a predetermined portion on the screen with a finger, a pen, or the like.

Examples of the operation principle of the touch panel 636 include, but are not particularly limited to, a resistance film system, a capacitive coupling system, an infrared system, an ultrasonic system, an electromagnetic induction coupling system, and the like. Especially, the resistance film system and the capacitive coupling system are preferred from the viewpoint of cost reduction.

In the case where the resistance film system is adopted, the touch panel 636 includes, for example, a pair of substrates (such as, for example, glass substrates, and plastic substrates) arranged so as to face each other, insulating spacers sandwiched between the pair of substrates, a transparent conductive film provided, as a resistance film, on the whole inner surface of each of the substrates, and a touch position detection circuit. In this resistance film system, when the surface of one of the substrates is touched, the resistance films of the substrates are brought into contact with each other (short-circuited), and a current is made to flow between the resistance films. The touched position is detected by detecting a voltage change at this time by the touch position detection circuit.

In the case where the capacitive coupling system is adopted, the touch panel 636 includes, for example, a substrate (such as, for example, a glass substrate, and a plastic substrate), a transparent electrode provided on the whole back surface of the substrate, a plurality of position detection electrodes provided at a fixed pitch in the peripheral section of the transparent electrode, and a position detection circuit for detecting a touch position. In the capacitive coupling system, when the surface of the substrate is touched, the transparent electrode is grounded at the touched position via the capacitance of the human body, and thereby the resistance value between each of the position detection electrodes and the grounding point is changed. The touched position is detected by detecting the change in the resistance value by the touch position detection circuit.

As described above, with the present embodiment, it is possible to obtain the effect of the touch panel 636 described above, in addition to the effect described in Embodiment 2.

Embodiment 8

Figure 12:
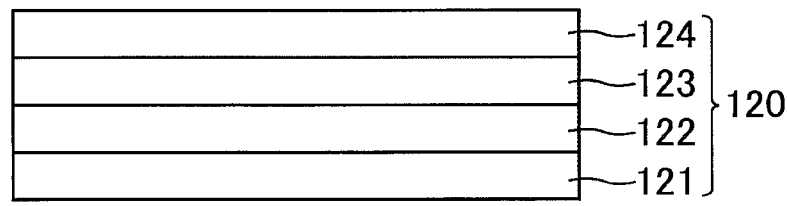
FIG. 12 is a schematic cross-sectional view showing a configuration of a three-dimensional video recognition system of Embodiment 8.
Figure 12:
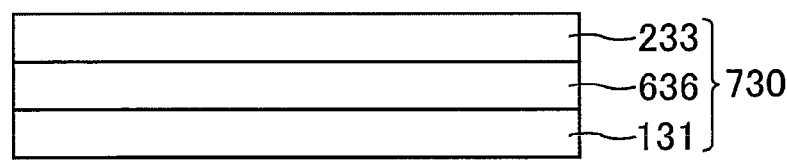
Figure 12:
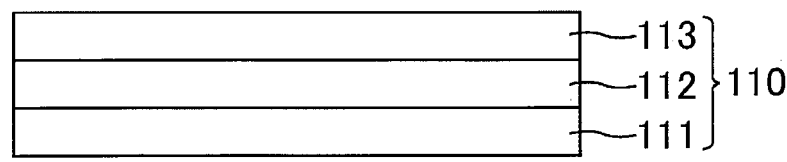

As shown in FIG. 12, a three-dimensional video recognition system of a present embodiment has the same configuration as that of the three-dimensional video recognition system of Embodiment 7 except that a front plate 730 included instead of the front plate 630.

The front plate 730 is further provided with the surface treatment film 233 described in Embodiment 3 on the front surface side of the touch panel 636. The λ/4 plate 131, the touch panel 636, and the surface treatment film 233 are laminated in this order from the side of the display device 110. The touch panel 636 and the surface treatment film 233 are bonded together by a bonding material or an adhesive.

As described above, with the present embodiment, it is possible to obtain the effect of the surface treatment film 233 in addition to the effect described in Embodiment 7.

Embodiment 9

Figure 13:
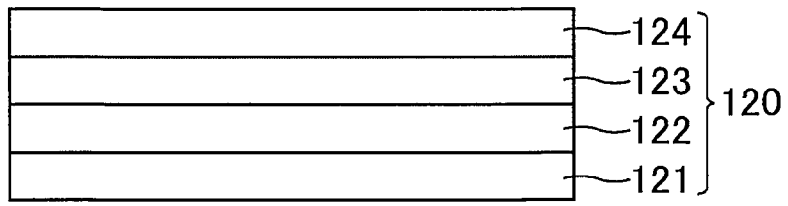
FIG. 13 is a schematic cross-sectional view showing a configuration of a three-dimensional video recognition system of Embodiment 9.
Figure 13:
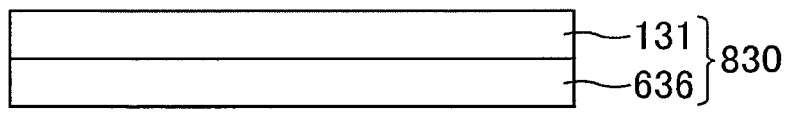
Figure 13:
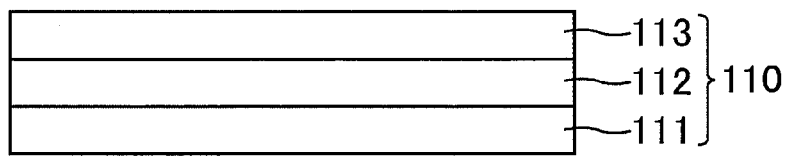

As shown in FIG. 13, a three-dimensional video recognition system according to a present embodiment has the same configuration as that of the three-dimensional video recognition system of Embodiment 7 except that the arrangement positions of the touch panel 636 and the λ/4 plate 131 are different.

In a front plate 830 according to the present embodiment, the touch panel 636, and the λ/4 plate 131 are laminated in this order from the side of the display device 110.

With the present embodiment, it is possible to obtain the same effect as that described in Embodiment 7.

Embodiment 10

Figure 14:
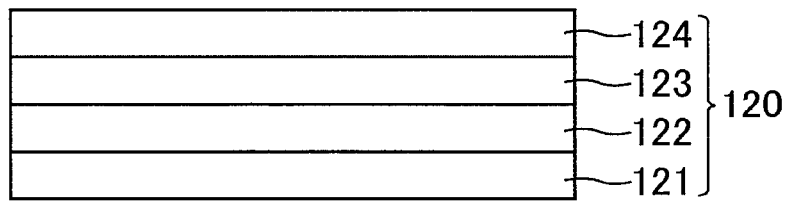
FIG. 14 is a schematic cross-sectional view showing a configuration of a three-dimensional video recognition system of Embodiment 10.
Figure 14:
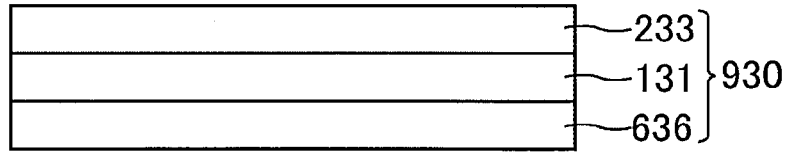
Figure 14:
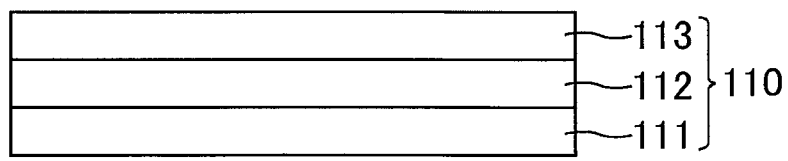

As shown in FIG. 14, a three-dimensional video recognition system according to a present embodiment has the same configuration as that of the three-dimensional video recognition system of Embodiment 8 except that the arrangement positions of the touch panel 636 and the λ/4 plate 131 are different.

In a front plate 930 according to the present embodiment, the touch panel 636, the λ/4 plate 131, and the surface treatment film 233 are laminated in this order from the side of the display device 110.

With the present embodiment, it is possible to obtain the same effect as that described in Embodiment 8.

Further, the λ/4 plate 131, and the surface treatment film 233 are arranged together on one side of the touch panel 636. Thereby, the film lamination process can be simplified, and hence the cost can be reduced.

Embodiment 11

Figure 15:
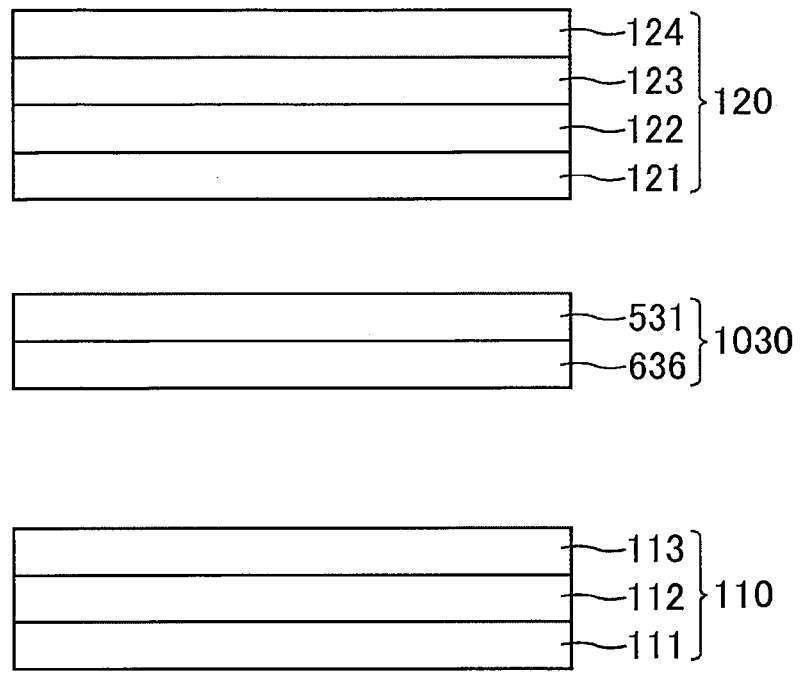
FIG. 15 is a schematic cross-sectional view showing a configuration of a three-dimensional video recognition system of Embodiment 11.
Figure 16:
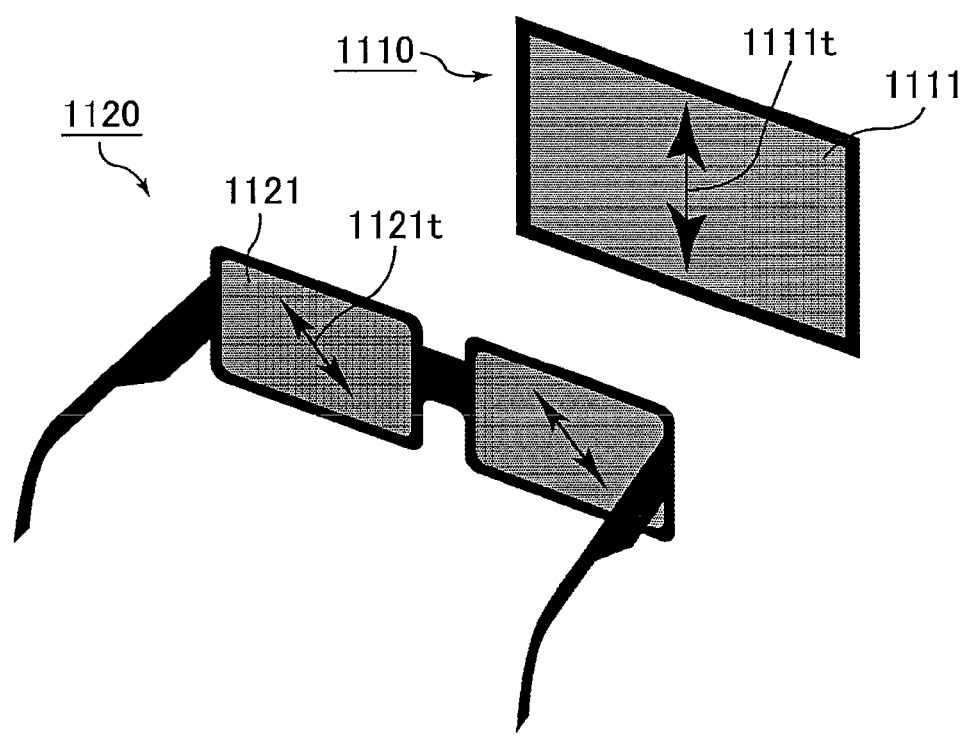
FIG. 16 is a schematic perspective view showing a configuration of a conventional three-dimensional video recognition system.
Figure 17:
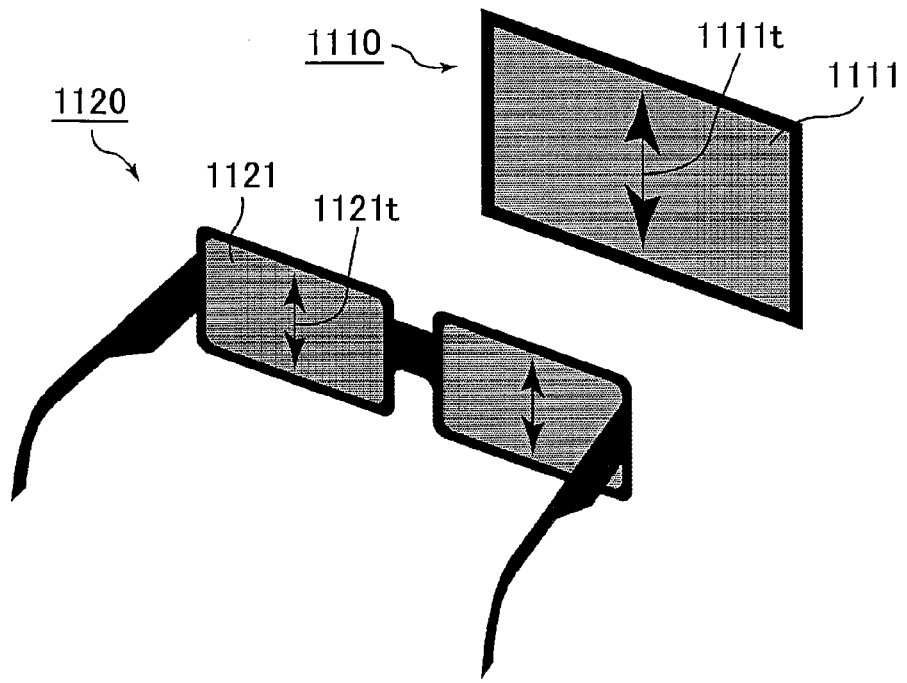
FIG. 17 is a schematic perspective view showing a configuration of a conventional three-dimensional video recognition system.
Figure 18:
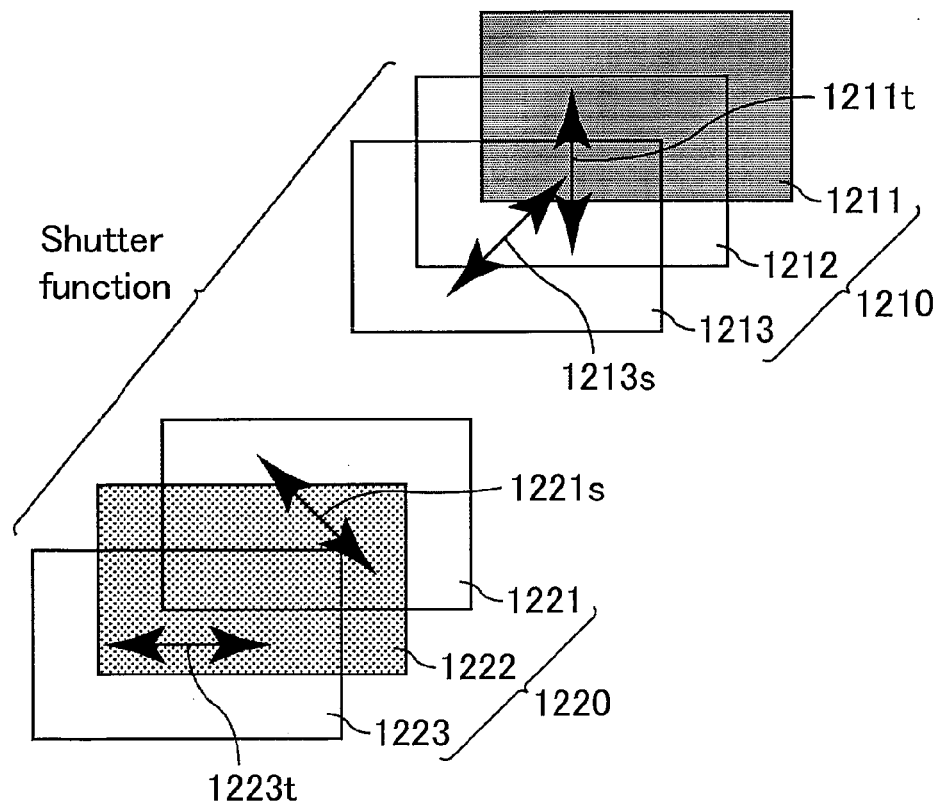
FIG. 18 is a schematic perspective view showing a configuration of a three-dimensional video recognition system described in Patent Document 2.

As shown in FIG. 15, a three-dimensional video recognition system of a present embodiment has the same configuration as that of the three-dimensional video recognition system of Embodiment 9 except that the λ/4 plate 531 provided with the surface treatment layer and described in Embodiment 6 is included instead of the λ/4 plate 131.

In a front plate 1030 according to the present embodiment, the touch panel 636, and the λ/4 plate 531 are laminated in this order from the side of the display device 110. The touch panel 636 and the λ/4 plate 531 are bonded together by a bonding material or an adhesive.

With the present embodiment, it is possible to obtain the same effect as that described in Embodiment 3 in addition to the effect described in Embodiment 7.

Embodiment 12

A three-dimensional video recognition system of a present embodiment has the same configuration as that of the three-dimensional video recognition system of each of Embodiment 2 to Embodiment 11 except that the front plate of each of Embodiment 2 to Embodiment 11 can be arbitrarily attached and removed by the observer. Thereby, the front plate can be removed at the time of two-dimensional video display, and two-dimensional video can be viewed without through the front plate. Therefore, it is possible to improve the screen brightness at the time of two-dimensional video display.

The present application claims priority to Patent Application No. 2009-260284 filed in Japan on Nov. 13, 2009 and Patent Application No. 2010-114599 filed in Japan on May 18, 2010 under the Paris Convention and provisions of national law in a designated State, the entire contents of which are hereby incorporated by reference.

REFERENCE SIGNS LIST

10, 110: Video display device
11, 111: Linear polarizing element (back polarizer)
12, 23, 112, 123: Liquid crystal cell
13, 113: Linear polarizing element (front polarizer)
14, 21, 121, 131: λ/4 plate
20, 120: Active shutter glasses
22, 122: Linear polarizing element (outer polarizer)
24, 124: Linear polarizing element (inner polarizer)
130, 230, 330, 430, 530, 630, 730, 830, 930, 1030: Front plate
132: Protective plate
233: Surface treatment film
234: Protrusion
235: Base film
531: λ/4 plate with surface treatment layer
636: Touch Panel

The invention claimed is:

1. A three-dimensional video recognition system comprising
a video display device which can display a right-eye image and a left-eye image alternately in a time division manner on a screen of the display device, and
active shutter glasses which can alternately switch between a light transmitting state and a light shielding state of right and left lens sections in synchronization with the right-eye image and the left-eye image,
wherein each of the active shutter glasses includes a first λ/4 plate, a first linear polarizing element, a liquid crystal cell, and a second linear polarizing element in this order from an outer surface side of each of the active shutter glasses,
wherein the video display device includes a third linear polarizing element provided on an observation surface side of the video display device,
the three-dimensional video recognition system further comprising a second λ/4 plate,
wherein the second λ/4 plate is arranged between the third linear polarizing element and the first λ/4 plate,
wherein, when an angle formed between a transmission axis of the first linear polarizing element and an in-plane slow axis of the first λ/4 plate is defined as φ1, and when an angle formed between a transmission axis of the third linear polarizing element and an in-plane slow axis of the second λ/4 plate is defined as φ2, the following expressions (1) and (2) or the following expressions (3) and (4) are satisfied:

$$40° \leq \phi1 \leq 50° \quad (1)$$

$$40° \leq \phi2 \leq 50° \quad (2)$$

$$130° \leq \phi1 \leq 140° \quad (3)$$

$$130° \leq \phi2 \leq 140° \quad (4)$$

where φ1 is measured as viewed from the side of the first λ/4 plate and is measured in a counterclockwise direction taken as a positive direction with reference to a direction of the transmission axis of the first linear polarizing element, and where, similarly, φ2 is measured as viewed from the side of the second λ/4 plate and is measured in a counterclockwise direction taken as a positive direction with reference to a direction of the transmission axis of the third linear polarizing element.

2. The three-dimensional video recognition system according to claim 1,
wherein the liquid crystal cell is a first liquid crystal cell, and
wherein the video display device is a liquid crystal display device and includes a fourth linear polarizing element, a second liquid crystal cell, and the third linear polarizing element in this order from a back surface side.

3. A three-dimensional video recognition system comprising
a video display device which can display a right-eye image and a left-eye image alternately in a time division manner on a screen of the display device, and
active shutter glasses which can alternately switch between a light transmitting state and a light shielding state of right and left lens sections in synchronization with the right-eye image and the left-eye image,
wherein each of the active shutter glasses includes a first λ/4 plate, a first linear polarizing element, a liquid crystal cell, and a second linear polarizing element in this order from an outer surface side of each of the active shutter glasses,
wherein the video display device includes a third linear polarizing element provided on an observation surface side of the video display device, and a second λ/4 plate provided on the observation surface side of the third linear polarizing element, and
wherein, when an angle formed between a transmission axis of the first linear polarizing element and an in-plane slow axis of the first λ/4 plate is defined as φ1, and when an angle formed between a transmission axis of the third linear polarizing element and an in-plane slow axis of the second λ/4 plate is defined as φ2, the following expressions (1) and (2) or the following expressions (3) and (4) are satisfied:

$$40° \leq \phi1 \leq 50° \quad (1)$$

$$40° \leq \phi2 \leq 50° \quad (2)$$

$$130° \leq \phi1 \leq 140° \quad (3)$$

$$130° \leq \phi2 \leq 140° \quad (4)$$

where φ1 is measured as viewed from the side of the first λ/4 plate and is measured in a counterclockwise direction taken as a positive direction with reference to a direction of the transmission axis of the first linear polarizing element, and where, similarly, φ2 is measured as viewed from the side of the second λ/4 plate and is measured in a counterclockwise direction taken as a positive direction with reference to a direction of the transmission axis of the third linear polarizing element.

4. The three-dimensional video recognition system according to claim 3,
wherein the liquid crystal cell is a first liquid crystal cell, and wherein the video display device is a liquid crystal display device and includes a fourth linear polarizing element, a second liquid crystal cell, and the third linear polarizing element in this order from a back surface side.

5. A three-dimensional video recognition system comprising
   a video display device which can display a right-eye image and a left-eye image alternately in a time division manner on a screen of the display device,
   active shutter glasses which can alternately switch between a light transmitting state and a light shielding state of right and left lens sections in synchronization with the right-eye image and the left-eye image, and
   a front plate which is arranged on a front surface side of the video display device,
   wherein each of the active shutter glasses includes a first λ/4 plate, a first linear polarizing element, a liquid crystal cell, and a second linear polarizing element in this order from an outer surface side of each of the active shutter glasses,
   wherein the video display device includes a third linear polarizing element provided on an observation surface side of the video display device,
   wherein the front plate includes a second λ/4 plate, and
   wherein, when an angle formed between a transmission axis of the first linear polarizing element and an in-plane slow axis of the first λ/4 plate is defined as φ1, and when an angle formed between a transmission axis of the third linear polarizing element and an in-plane slow axis of the second λ/4 plate is defined as φ2, the following expressions (1) and (2) or the following expressions (3) and (4) are satisfied:

$$40° \leq \phi1 \leq 50° \quad (1)$$

$$40° \leq \phi2 \leq 50° \quad (2)$$

$$130° \leq \phi1 \leq 140° \quad (3)$$

$$130° \leq \phi2 \leq 140° \quad (4)$$

where φ1 is measured as viewed from the side of the first λ/4 plate and is measured in a counterclockwise direction taken as a positive direction with reference to a direction of the transmission axis of the first linear polarizing element, and where, similarly, φ2 is measured as viewed from the side of the second λ/4 plate and is measured in a counterclockwise direction taken as a positive direction with reference to a direction of the transmission axis of the third linear polarizing element.

6. The three-dimensional video recognition system according to claim 5,
   wherein the liquid crystal cell is a first liquid crystal cell, and
   wherein the video display device is a liquid crystal display device and includes a fourth linear polarizing element, a second liquid crystal cell, and the third linear polarizing element in this order from a back surface side.

7. The three-dimensional video recognition system according to claim 5, wherein the front plate further includes a protective plate or a touch panel.

8. The three-dimensional video recognition system according to claim 7,
   wherein the front plate further includes a surface treatment film, and
   wherein the second λ/4 plate and the surface treatment film are provided on the front surface side of the protective plate or the touch panel.

9. A video display device that can be used together with active shutter glasses, each including a first λ/4 plate, a first linear polarizing element, a liquid crystal cell, and a second linear polarizing element in this order from an outer surface side of each of the active shutter glasses, and can display a right-eye image and a left-eye image alternately in a time division manner on a screen of the display device, the video display device comprising:
   a third linear polarizing element provided on an observation surface side of the video display device, and a second λ/4 plate provided on the observation surface side of the third linear polarizing element,
   wherein, when an angle formed between a transmission axis of the third linear polarizing element and an in-plane slow axis of the second λ/4 plate is defined as φ2, the following expression (1) or (2) is satisfied:

$$40° \leq \phi2 \leq 50° \quad (1)$$

$$130° \leq \phi2 \leq 140° \quad (2)$$

where φ2 is measured as viewed from the side of the second λ/4 plate and is measured in a counterclockwise direction taken as a positive direction with reference to a direction of the transmission axis of the third linear polarizing element.

10. The video display device according to claim 9,
    wherein the liquid crystal cell is a first liquid crystal cell, and
    wherein the video display device is a liquid crystal display device and includes a fourth linear polarizing element, a second liquid crystal cell, and the third linear polarizing element in this order from a back surface side.

11. Active shutter glasses which can alternately switch between a light transmitting state and a light shielding state of right and left lens sections in synchronization with a right-eye image and a left-eye image which are displayed alternately in a time division manner, each of the active shutter glasses comprising
    a λ/4 plate, a first linear polarizing element, a liquid crystal cell, and a second linear polarizing element in this order from an outer surface side of each of the active shutter glasses,
    wherein, when an angle formed between a transmission axis of the first linear polarizing element and an in-plane slow axis of the λ/4 plate is defined as φ1, the following expression (1) or (2) is satisfied:

$$40° \leq \phi1 \leq 50° \quad (1)$$

$$130° \leq \phi1 \leq 140° \quad (2)$$

where φ1 is measured as viewed from the side of the λ/4 plate and is measured in a counterclockwise direction taken as a positive direction with reference to a direction of the transmission axis of the first linear polarizing element.

* * * * *